United States Patent
Yoshida

(10) Patent No.: US 12,032,805 B2
(45) Date of Patent: Jul. 9, 2024

(54) APPARATUS, CONTROL METHOD OF THE SAME, AND STORAGE MEDIUM FOR DISPLAYING BUTTONS ON A SCREEN BASED A STATE OF THE APPARATUS

(71) Applicant: CANON KABUSHIKI KAISHA, Tokyo (JP)

(72) Inventor: Hiroyoshi Yoshida, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/200,624

(22) Filed: Mar. 12, 2021

(65) Prior Publication Data

US 2021/0297539 A1    Sep. 23, 2021

(30) Foreign Application Priority Data

Mar. 18, 2020 (JP) ................. 2020-048200

(51) Int. Cl.
   *G06F 3/0482* (2013.01)
   *G06F 11/30* (2006.01)
   *G06F 11/34* (2006.01)
   *H04N 1/00* (2006.01)

(52) U.S. Cl.
   CPC ........ *G06F 3/0482* (2013.01); *G06F 11/3013* (2013.01); *G06F 11/3438* (2013.01); *H04N 1/00037* (2013.01); *H04N 1/00395* (2013.01); *H04N 1/00413* (2013.01)

(58) Field of Classification Search
   CPC .... G06F 3/0482; G06F 3/0483; G06F 3/0485; G06F 3/0486; G06F 11/3013; G06F 11/3438; H04N 1/00037; H04N 1/00395; H04N 1/00413; H04N 1/00411; H04N 1/00474
   See application file for complete search history.

(56) References Cited

U.S. PATENT DOCUMENTS

| | | | | |
|---|---|---|---|---|
| 2006/0208157 A1* | 9/2006 | Michiie | ............. | H04N 1/00689 250/208.1 |
| 2008/0052639 A1* | 2/2008 | Chun | ................. | G06F 16/9537 715/810 |
| 2012/0079400 A1* | 3/2012 | Nauerz | ................. | G06F 40/103 715/762 |
| 2014/0201681 A1* | 7/2014 | Mahaffey | .......... | H04M 1/72454 715/846 |
| 2014/0273984 A1* | 9/2014 | Aerrabotu | .......... | H04M 1/2746 455/414.1 |
| 2014/0300927 A1* | 10/2014 | Kuroda | ............. | H04N 1/00408 358/1.15 |
| 2015/0043021 A1* | 2/2015 | Ikeda | ................. | H04N 1/32561 358/1.13 |

(Continued)

FOREIGN PATENT DOCUMENTS

| | | |
|---|---|---|
| CN | 101494711 A | 7/2009 |
| CN | 104519221 A | 4/2015 |

(Continued)

*Primary Examiner* — Jennifer N Welch
*Assistant Examiner* — Ashley M Fortino
(74) *Attorney, Agent, or Firm* — Canon U.S.A., Inc. IP Division

(57) ABSTRACT

Embodiments of the present disclosure include an apparatus that stores a button usage history for each state of the apparatus and recommends buttons to a user based on the detected state of the apparatus and the stored button usage history.

18 Claims, 30 Drawing Sheets

(56) References Cited

U.S. PATENT DOCUMENTS

2015/0339548 A1* 11/2015 Kitayama ................ B41J 29/00
  358/1.15
2015/0348499 A1* 12/2015 Kasamatsu .......... H04N 1/0035
  345/212

FOREIGN PATENT DOCUMENTS

| | | | |
|---|---|---|---|
| JP | 2003280782 | A | 10/2003 |
| JP | 2009058612 | A | 3/2009 |
| JP | 2012231547 | A | 11/2012 |
| JP | 2013-145946 | A | 7/2013 |
| JP | 2017042969 | A | 3/2017 |
| JP | 2017107528 | A | 6/2017 |

\* cited by examiner

FIG.5

| BUTTON ID (b) 501 | BUTTON NAME 502 | INVOKED APPLICATION 503 | SETTING VALUE 504 |
|---|---|---|---|
| B001 | SEND TO OWNER | SEND APPLICATION 406 | to:<<owneradress>>, two-sided, blancSkip |
| B002 | TWO-SIDED MONOCHROME COPY | COPY APPLICATION 404 | 1copies, BW, two-sided |
| B003 | ONE-SIDED COLOR COPY | COPY APPLICATION 404 | 1copies, AutoColor, one-sided |
| B004 | SCAN | SEND APPLICATION 406 | |
| B005 | COPY | COPY APPLICATION 404 | |
| B006 | PRINT ALL | PRINT APPLICATION 405 | allprint |
| B007 | PRINT | PRINT APPLICATION 405 | |
| ... | ... | ... | ... |

FIG.6A1
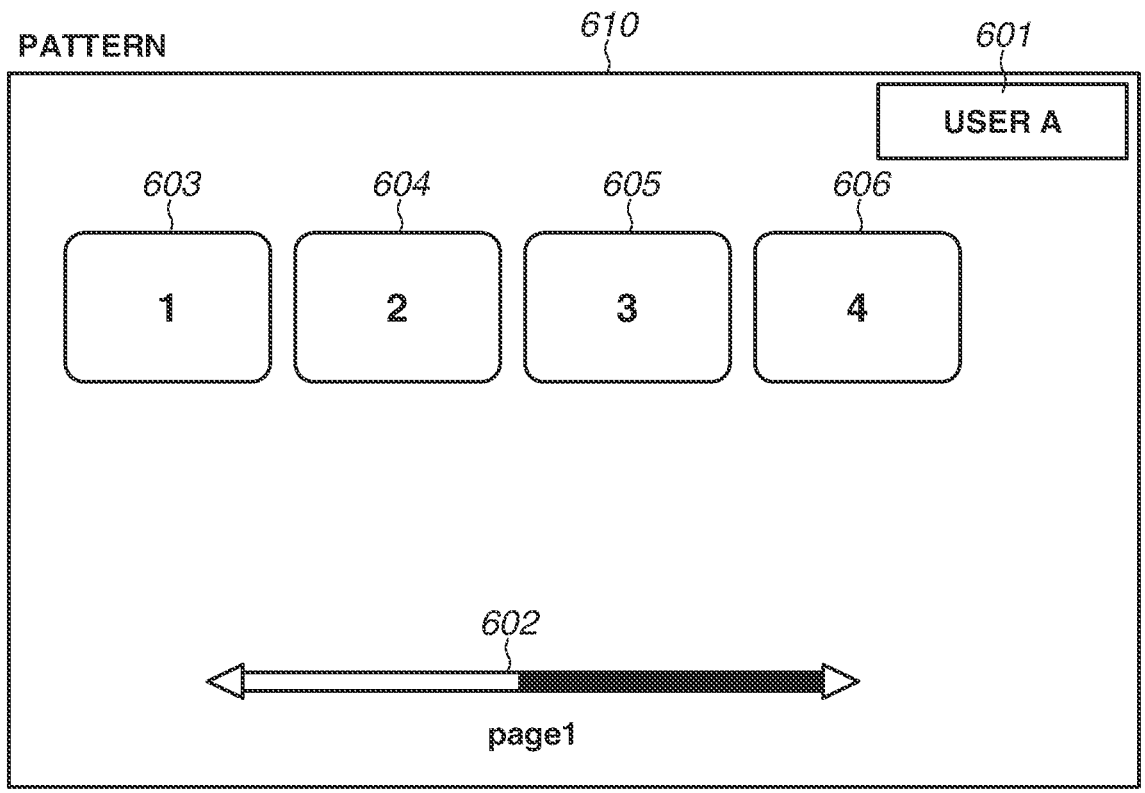
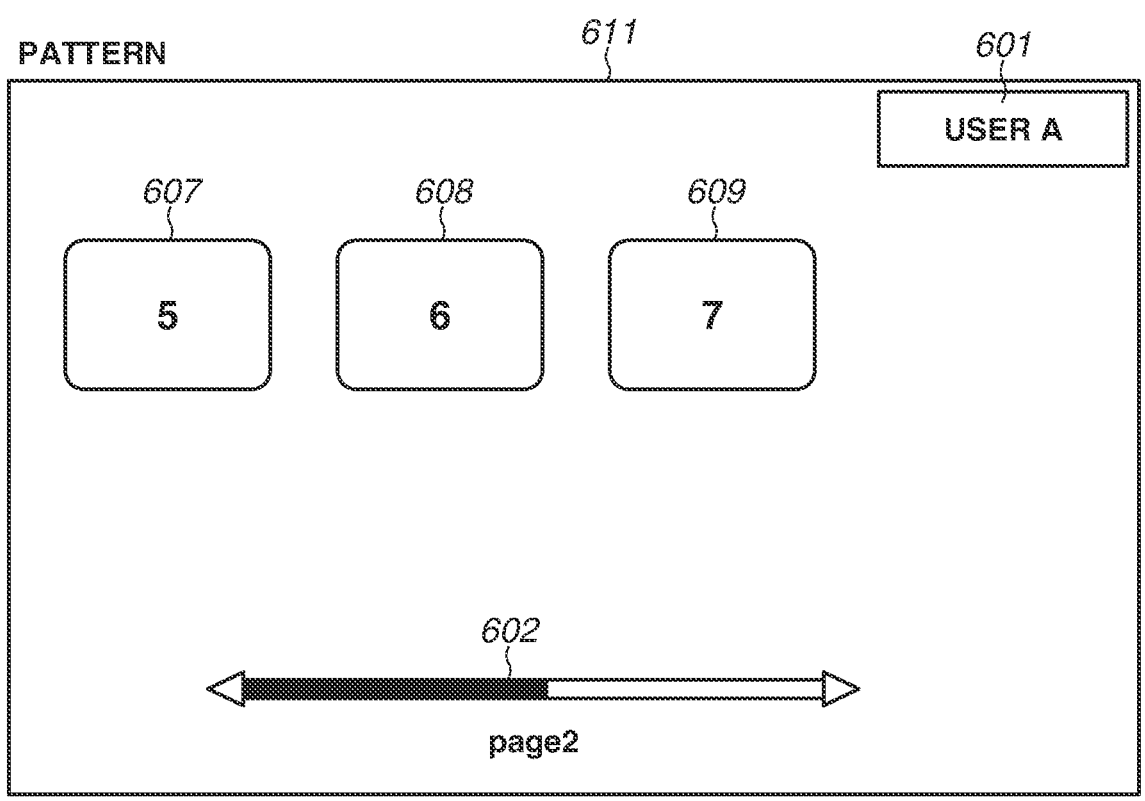

USER A

511: SEND TO OWNER / 300 dpi, IMAGE
512: ONE-SIDED MONOCHROME COPY / 1 COPY, MONOCHROME, ONE-SIDED
513: ONE-SIDED COLOR COPY / 1 COPY, COLOR, ONE-SIDED
514: SCAN

602 page1

(j=0, s=S00)   621

USER A

515: COPY
516: PRINT ALL / ESTIMATE.txt AND OTHER THREE DOCUMENTS
517: PRINT

602 page2

USER A

516: PRINT ALL ESTIMATE.txt AND OTHER THREE DOCUMENTS

517: PRINT

511: SEND TO OWNER 300 dpi, IMAGE

512: ONE-SIDED MONOCHROME COPY 1 COPY, MONOCHROME, ONE-SIDED

602 page1

631

USER A

513: ONE-SIDED COLOR COPY 1 COPY, COLOR, ONE-SIDED

514: SCAN

515: COPY

602 page2

FIG.6B1
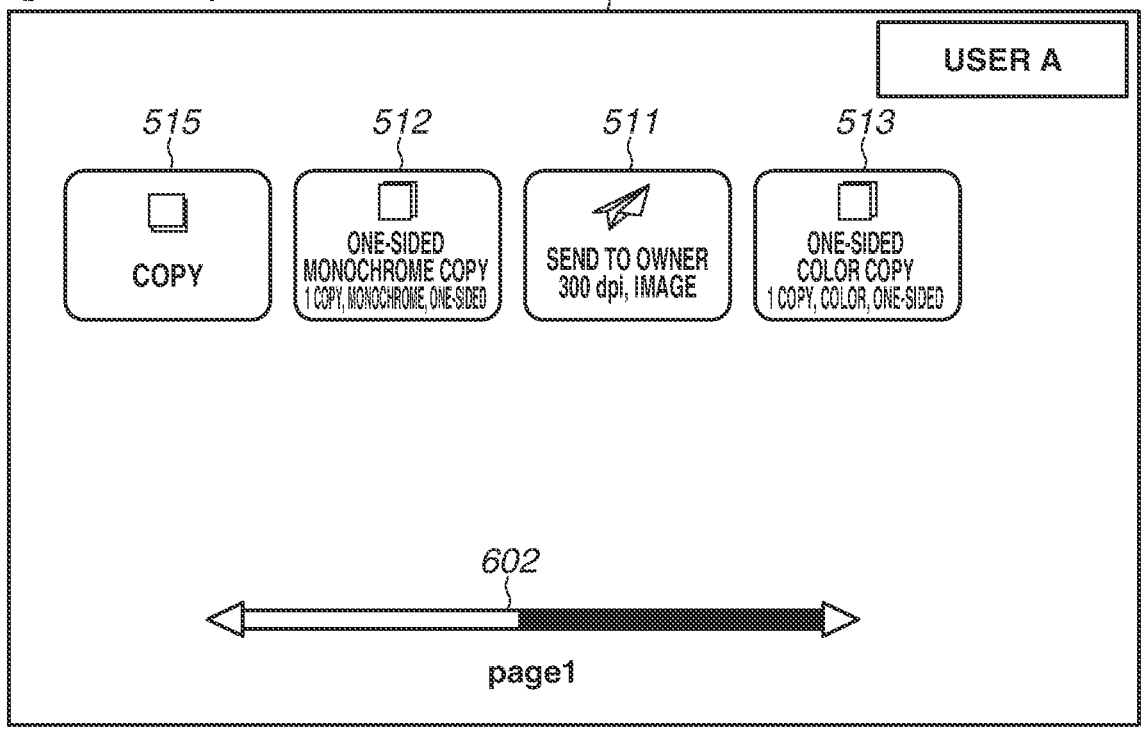
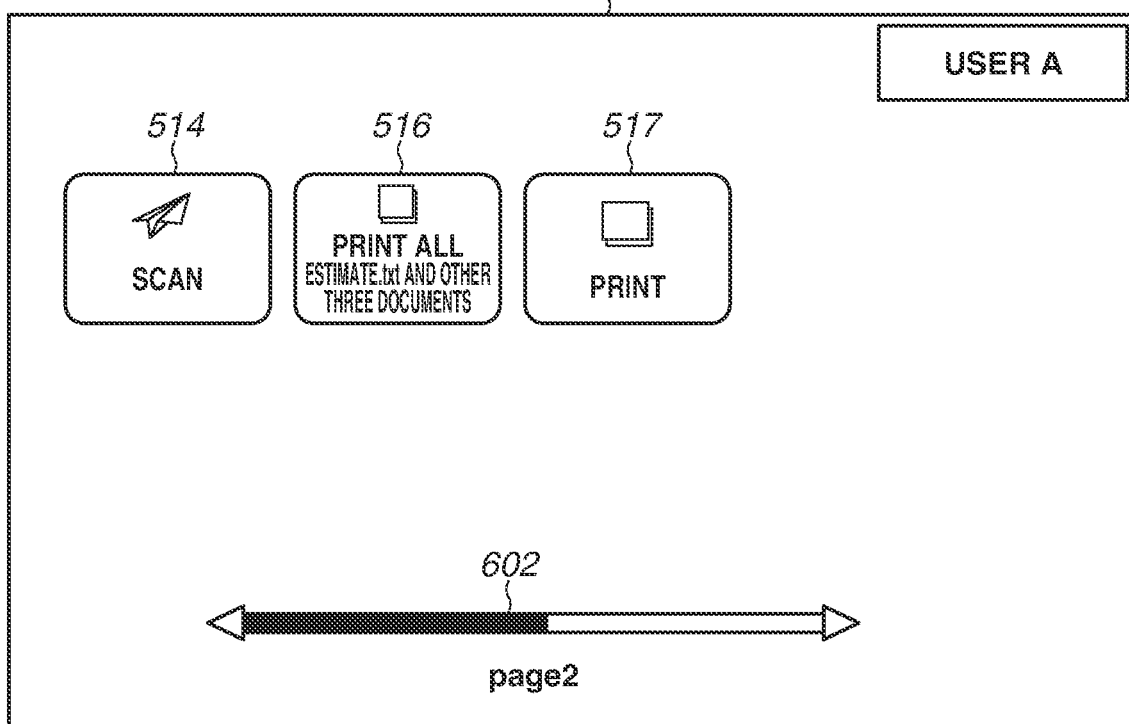

FIG.6B2
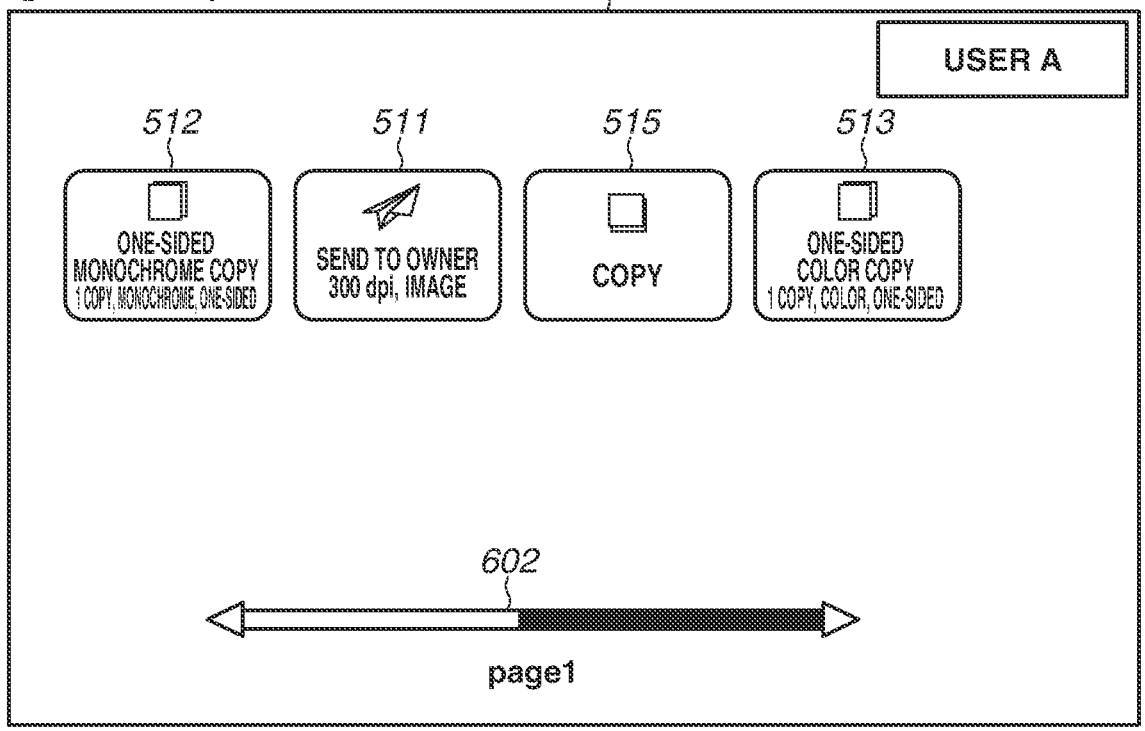
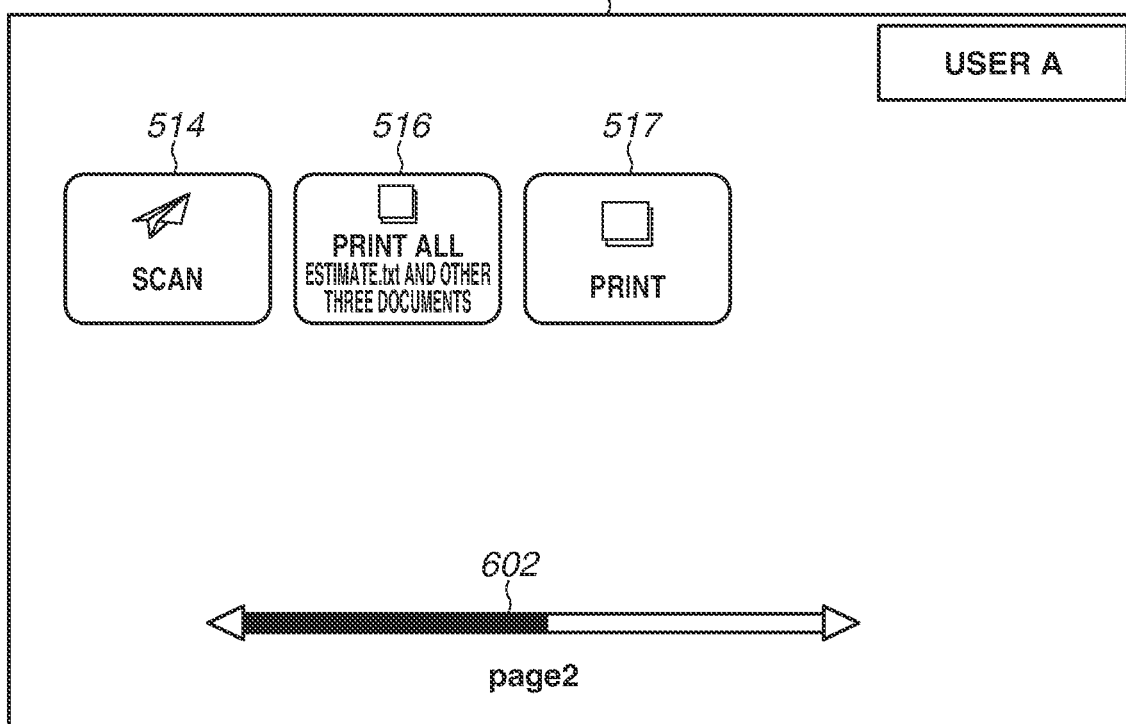

FIG.6B3
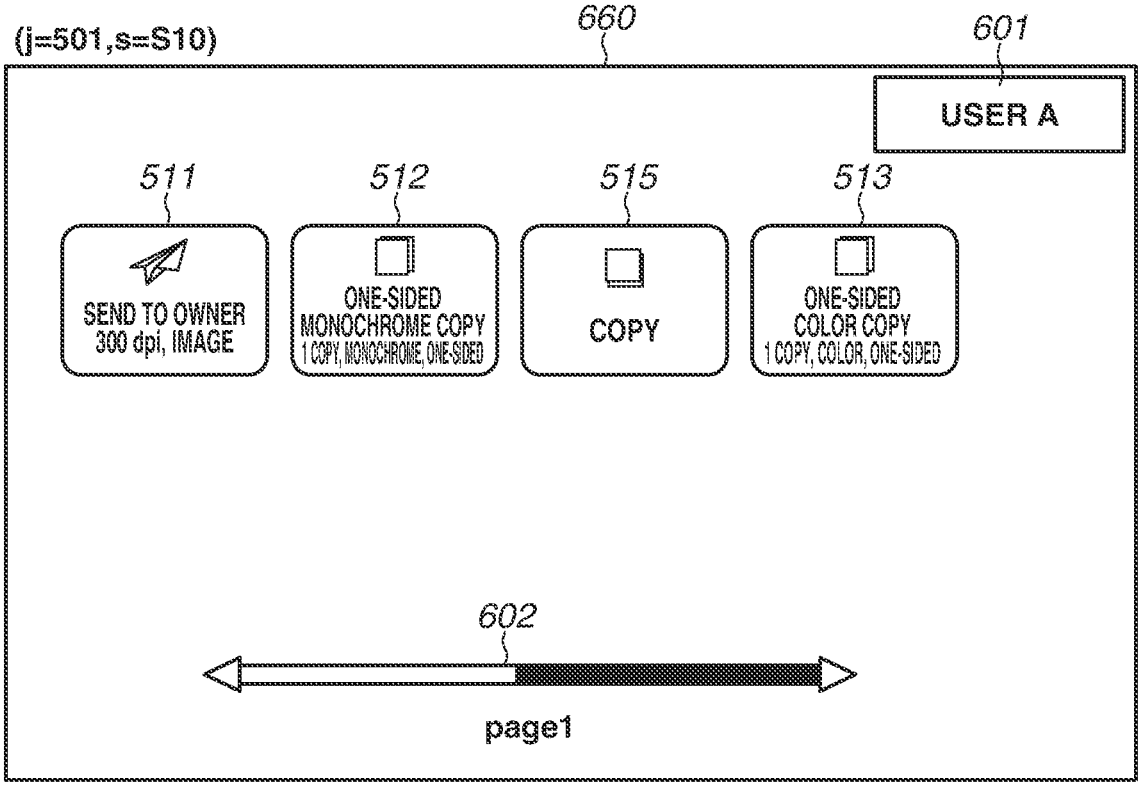
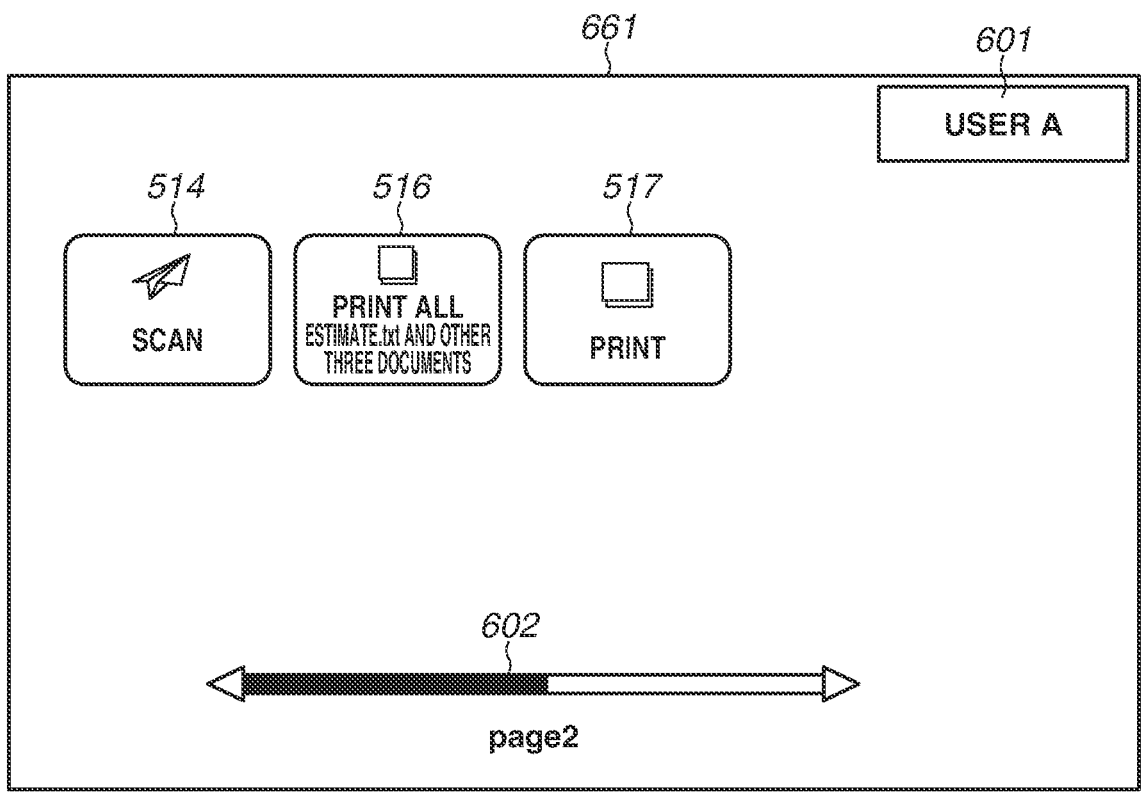

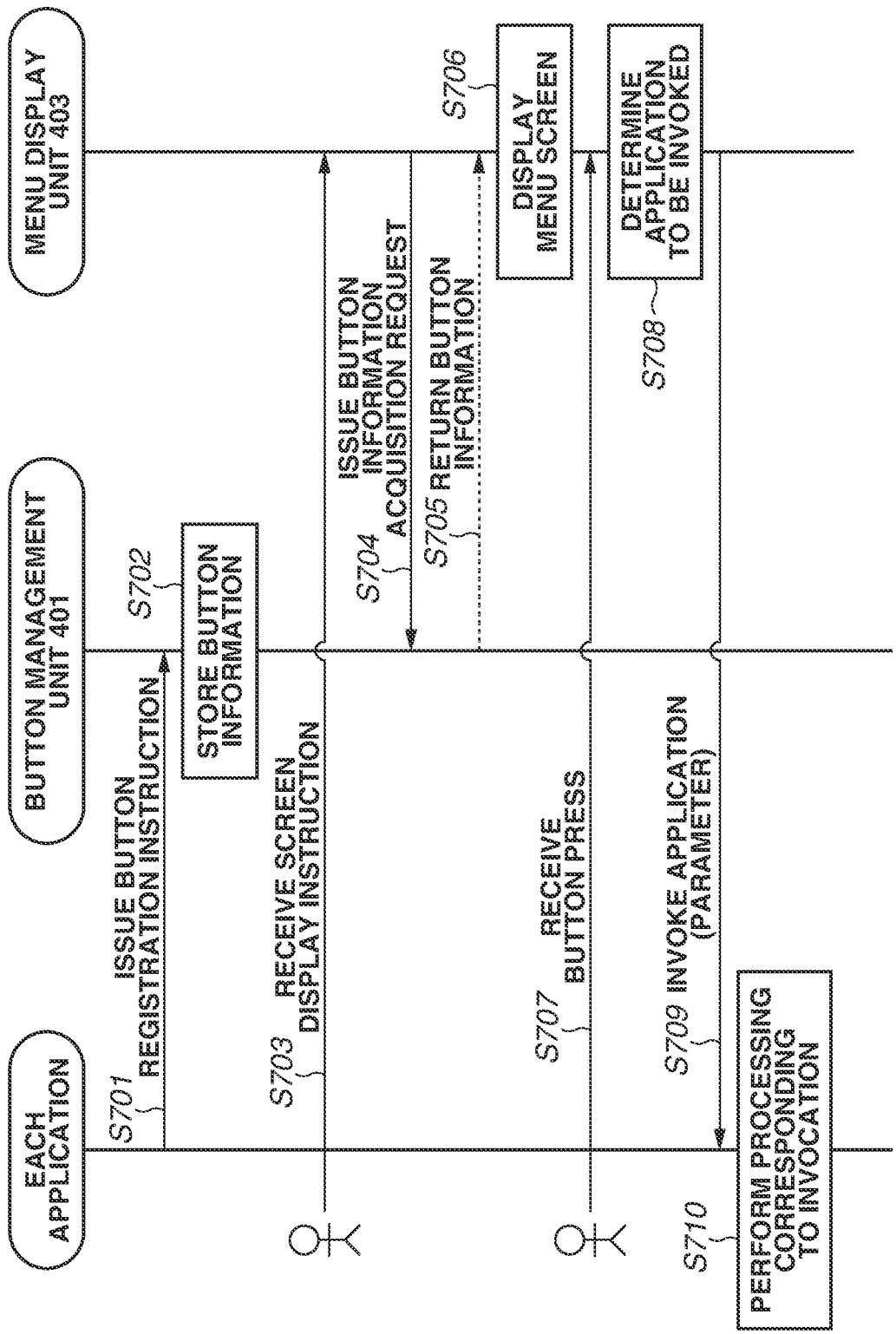

FIG.10A 1000 (j=0)

| | 1001 | 1002 | 1003 | 1004 | 1005 | 1006 | 1007 | 1008 | 1009 | 1010 |
|---|---|---|---|---|---|---|---|---|---|---|
| 1031 | STATE (s) | | | BUTTON ID (b) | | | | | | |
| | | PRESENCE OR ABSENCE OF PLACED DOCUMENT | PRESENCE OR ABSENCE OF UNPRINTED PRINT JOB | SEND TO OWNER (b=B001) | ONE-SIDED MONOCHROME COPY (b=B002) | ONE-SIDED COLOR COPY (b=B003) | SCAN (b=B004) | COPY (b=B005) | PRINT ALL (b=B006) | PRINT (b=B007) |
| 1033 | (s=S00) | 0 | 0 | 7 | 6 | 5 | 4 | 3 | 2 | 1 |
| 1034 | (s=S01) | 0 | 1 | 5 | 4 | 3 | 2 | 1 | 7 | 6 |
| 1035 | (s=S10) | 1 | 0 | 7 | 6 | 5 | 4 | 3 | 2 | 1 |
| 1036 | (s=S11) | 1 | 1 | 5 | 4 | 3 | 2 | 1 | 7 | 6 |

1100 (j=500)

| | 1001 | 1002 | 1003 | 1004 | 1005 | 1006 | 1007 | 1008 | 1009 | 1010 |
|---|---|---|---|---|---|---|---|---|---|---|
| 1037 | STATE (s) | | | BUTTON ID (b) | | | | | | |
| | | PRESENCE OR ABSENCE OF PLACED DOCUMENT | PRESENCE OR ABSENCE OF UNPRINTED PRINT JOB | SEND TO OWNER (b=B001) | ONE-SIDED MONOCHROME COPY (b=B002) | ONE-SIDED COLOR COPY (b=B003) | SCAN (b=B004) | COPY (b=B005) | PRINT ALL (b=B006) | PRINT (b=B007) |
| 1039 | (s=S00) | 0 | 0 | 17 | 36 | 5 | 4 | 263 | 2 | 1 |
| 1040 | (s=S01) | 0 | 1 | 5 | 14 | 3 | 2 | 31 | 2387 | 1676 |
| 1041 | (s=S10) | 1 | 0 | 77 | 86 | 15 | 4 | 33 | 2 | 1 |
| 1042 | (s=S11) | 1 | 1 | 5 | 404 | 3 | 2 | 1 | 27 | 6 |

FIG.10B 1200 (j=501)

| | 1001 | 1002 | 1003 | 1004 | 1005 | 1006 | 1007 | 1008 | 1009 | 1010 |
|---|---|---|---|---|---|---|---|---|---|---|
| 1043 | STATE (s) | | | BUTTON ID (b) | | | | | | |
| 1044 | | PRESENCE OR ABSENCE OF PLACED DOCUMENT | PRESENCE OR ABSENCE OF UNPRINTED PRINT JOB | SEND TO OWNER (b=B001) | ONE-SIDED MONOCHROME COPY (b=B002) | ONE-SIDED COLOR COPY (b=B003) | SCAN (b=B004) | COPY (b=B005) | PRINT ALL (b=B006) | PRINT (b=B007) |
| 1045 | (s=S00) | 0 | 0 | 17 | 36 | 5 | 4 | 263 | 2 | 1 |
| 1046 | (s=S01) | 0 | 1 | 5 | 14 | 3 | 2 | 31 | 2387 | 1676 |
| 1047 | (s=S10) | 1 | 0 | 87 | 86 | 15 | 4 | 33 | 2 | 1 |
| 1048 | (s=S11) | 1 | 1 | 5 | 404 | 3 | 2 | 1 | 27 | 6 |

FIG.13

| 1300 (i=100) | | | | | | | | | |
|---|---|---|---|---|---|---|---|---|---|
| | 1301 | 1302 | 1303 | 1304 | 1305 | 1306 | 1307 | 1308 | 1309 1310 |
| 1311 | STATE (s) | | | BUTTON ID (b) | | | | | |
| | | PRESENCE OR ABSENCE OF PLACED DOCUMENT | PRESENCE OR ABSENCE OF UNPRINTED PRINT JOB | SEND TO OWNER (b=B001) | ONE-SIDED MONOCHROME COPY (b=B002) | ONE-SIDED COLOR COPY (b=B003) | SCAN (b=B004) | COPY (b=B005) | PRINT ALL (b=B006) | PRINT (b=B007) |
| 1313 | (s=S00) | 0 | 0 | 17 | 36 | 5 | 4 | 263 | 2 | 1 |
| 1314 | (s=S01) | 0 | 1 | 2475 | 2534 | 3 | 2 | 31 | 2387 | 1676 |
| 1315 | (s=S10) | 1 | 0 | 87 | 86 | 15 | 4 | 33 | 2 | 1 |
| 1316 | (s=S11) | 1 | 1 | 5 | 404 | 3 | 2 | 1 | 27 | 6 |

FIG.14
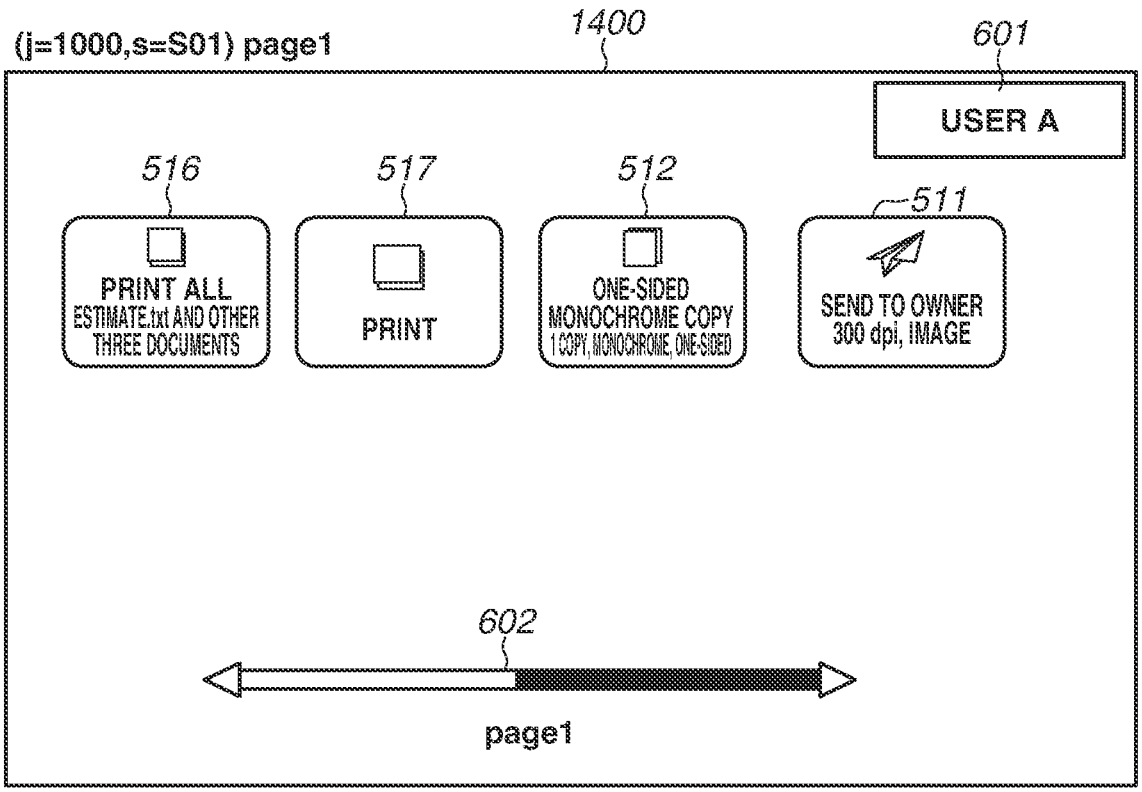
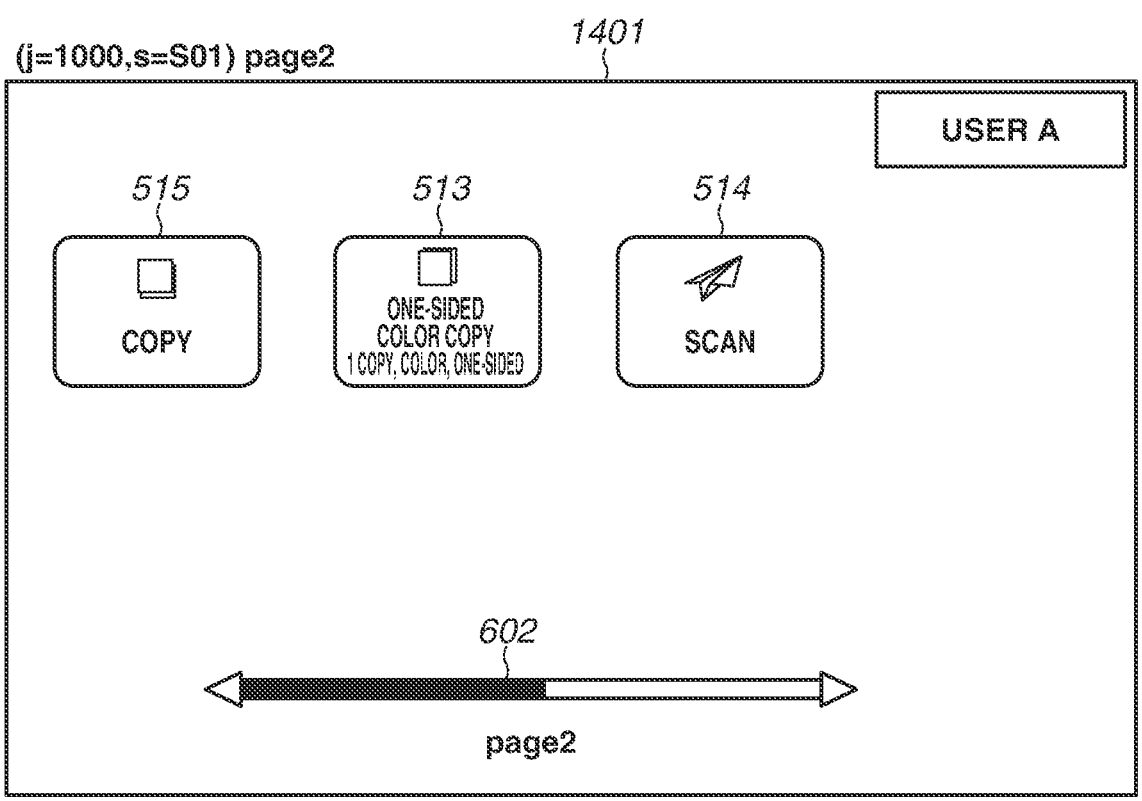

| | | 1502 | 1503 | 1504 | 1505 | 1506 | 1507 | 1508 | 1509 | 1510 | 1511 |
|---|---|---|---|---|---|---|---|---|---|---|---|
| 1501 | STATE (s) | PRESENCE OR ABSENCE OF PLACED DOCUMENT | PRESENCE OR ABSENCE OF UNPRINTED PRINT JOB | 1512 BUTTON ID (b) ||||||||
| | | | | STORE ESTIMATE REPORT (b=B008) | SEND TO OWNER (b=B001) | ONE-SIDED MONOCHROME COPY (b=B002) | ONE-SIDED COLOR COPY (b=B003) | SCAN (b=B004) | COPY (b=B005) | PRINT ALL (b=B006) | PRINT (b=B007) |
| 1514 | (s=S00) | 0 | 0 | 263 | 17 | 36 | 5 | 4 | 263 | 2 | 1 |
| 1515 | (s=S01) | 0 | 1 | 2534 | 2475 | 2534 | 3 | 2 | 31 | 2387 | 1676 |
| 1516 | (s=S10) | 1 | 0 | 87 | 87 | 86 | 15 | 4 | 33 | 2 | 1 |
| 1517 | (s=S11) | 1 | 1 | 404 | 5 | 404 | 3 | 2 | 1 | 27 | 6 |

FIG.17

| | 1701 | 1702 | 1703 | 1704 |
|---|---|---|---|---|
| 1700 | BUTTON ID (b) | BUTTON NAME | INVOKED APPLICATION | SETTING VALUE |
| 1711 | B001 | SEND TO OWNER | SEND APPLICATION 406 | to:<<owneradress>> two-sided, blancSkip |
| 1712 | B002 | TWO-SIDED MONOCHROME COPY | COPY APPLICATION 404 | 1copies, BW, two-sided |
| 1713 | B003 | ONE-SIDED COLOR COPY | COPY APPLICATION 404 | 1copies, AutoColor, one-sided |
| 1714 | B004 | SCAN | SEND APPLICATION 406 | |
| 1715 | B005 | COPY | COPY APPLICATION 404 | |
| 1716 | B006 | PRINT ALL | PRINT APPLICATION 405 | allprint |
| 1717 | B007 | PRINT | PRINT APPLICATION 405 | |
| 1718 | B008 | STORE ESTIMATE REPORT | SEND APPLICATION 406 | to:\\folder\..., two-sided, blancSkip |
| | ... | ... | ... | ... |

FIG.18A
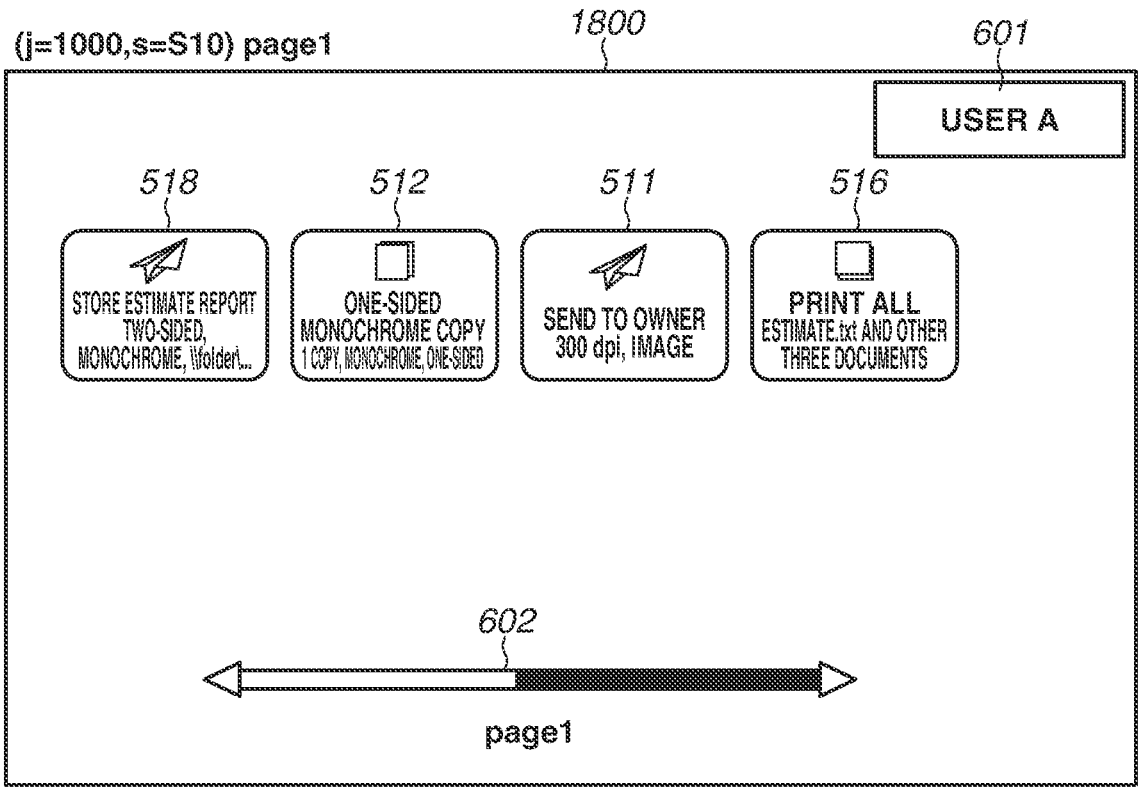
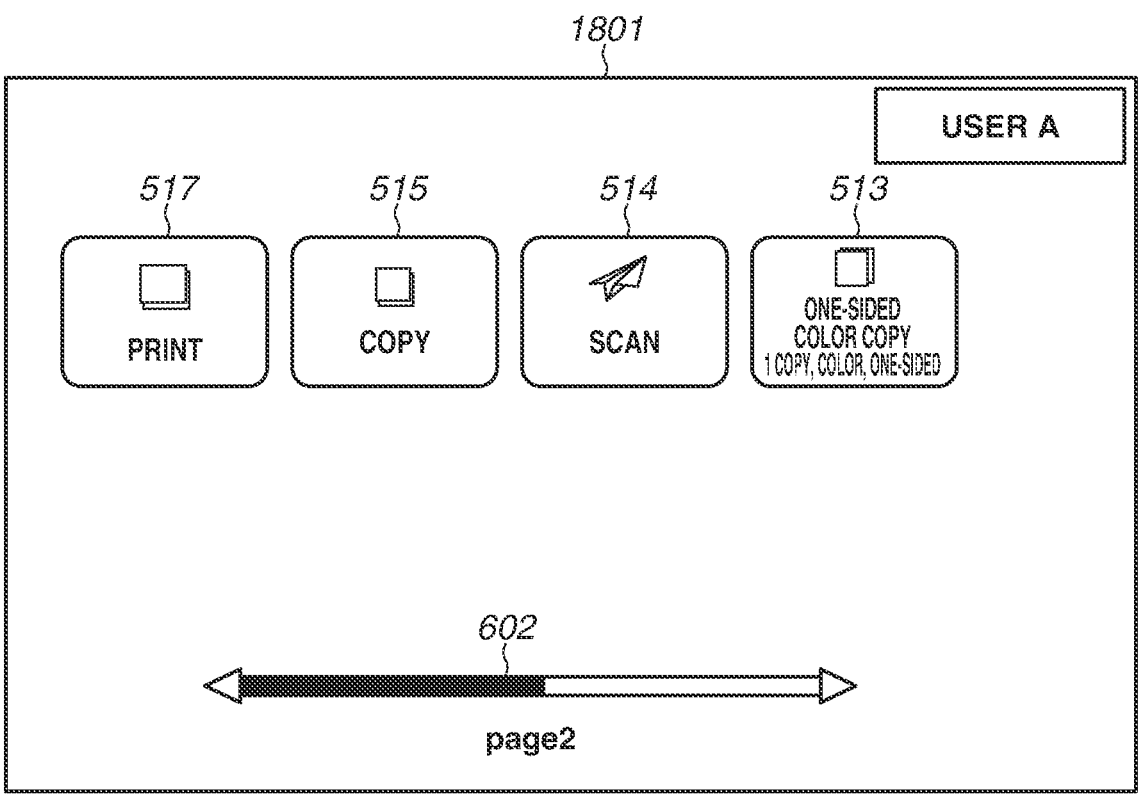

FIG.18B
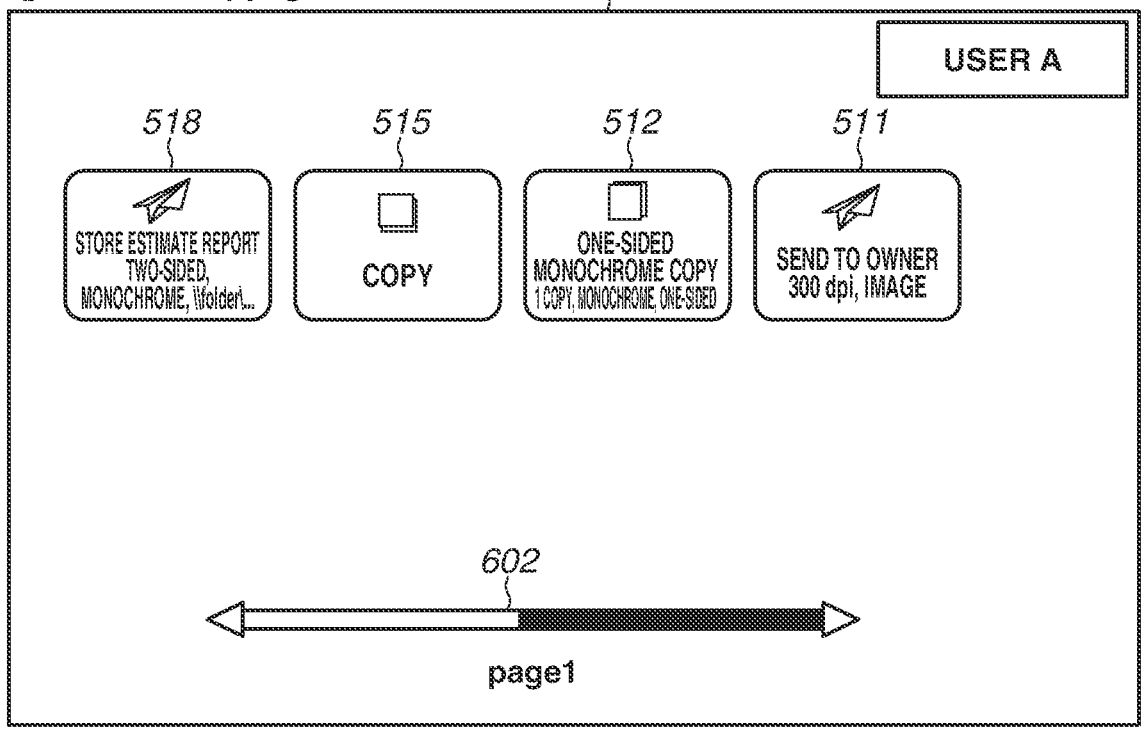
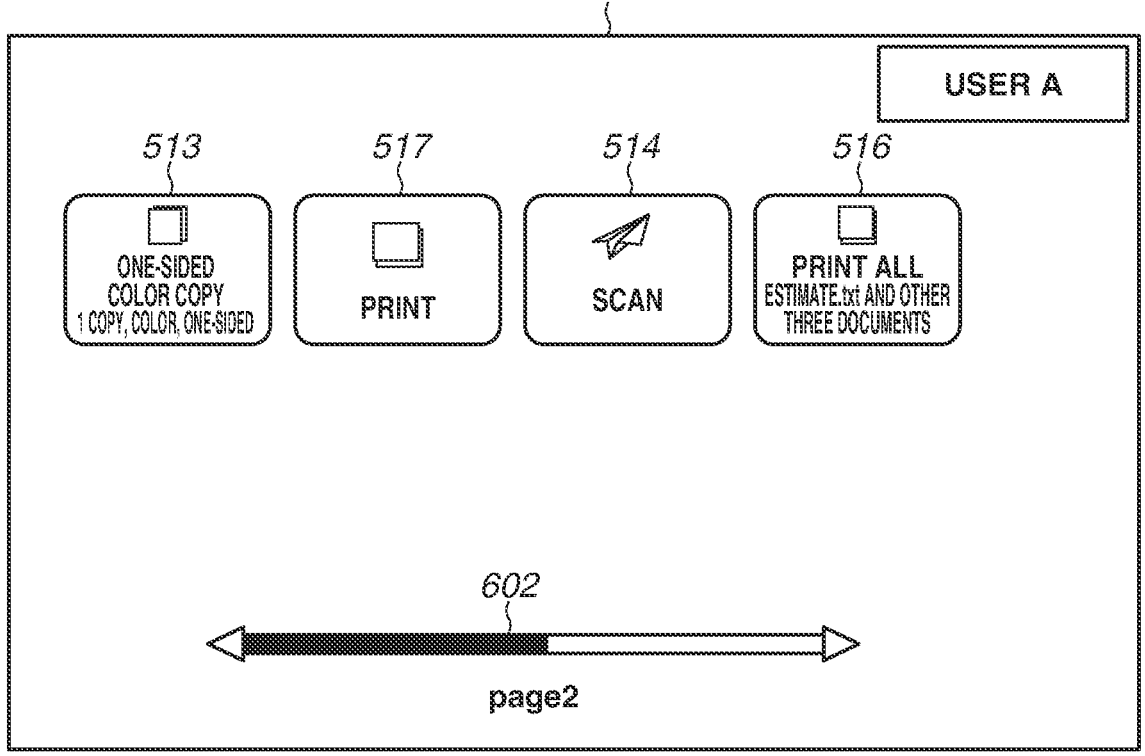

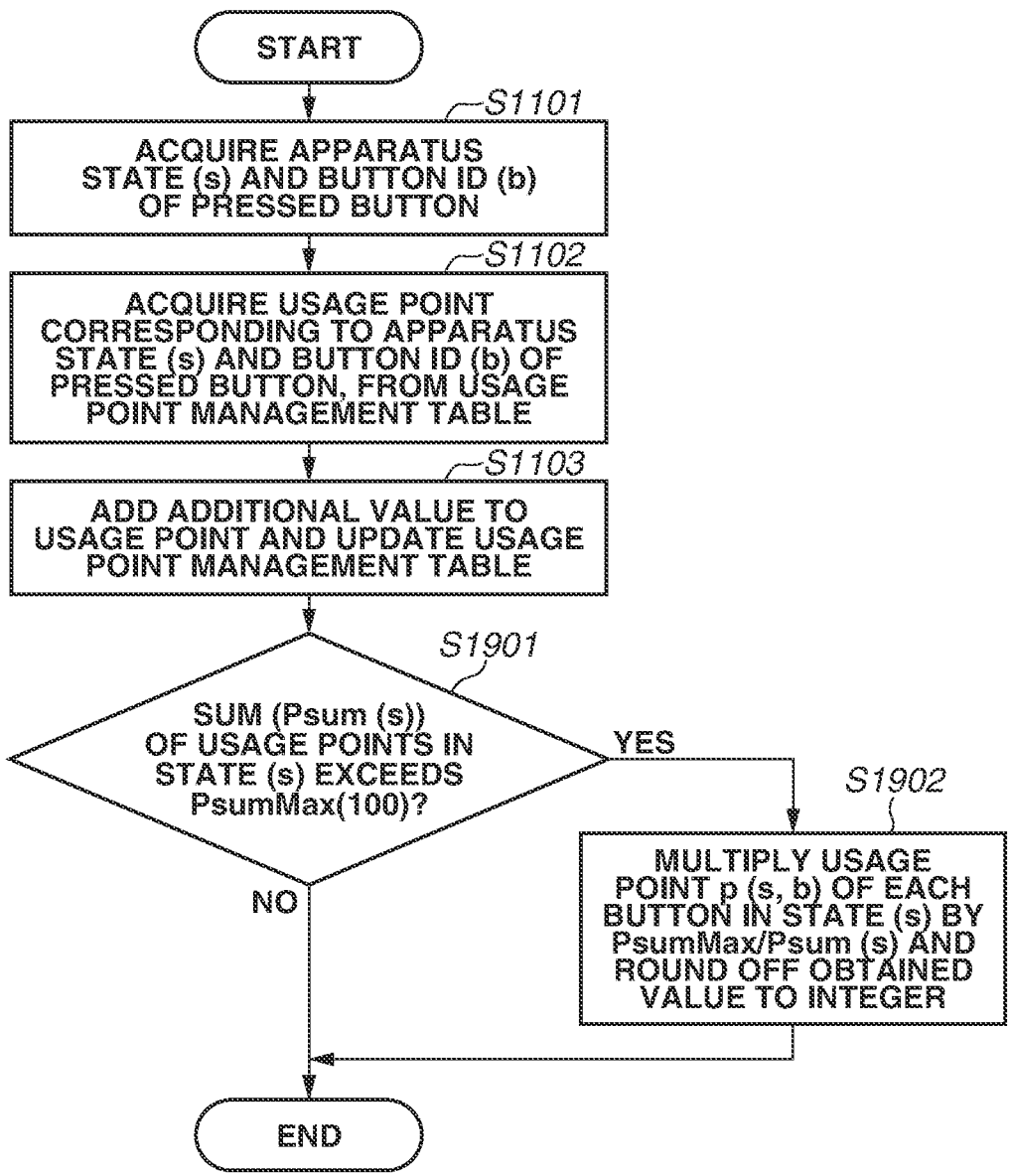

FIG.20A 2000 (j=500 normalized by 200)

| STATE (s) | | BUTTON ID (b) | | | | | | |
|---|---|---|---|---|---|---|---|---|
| | PRESENCE OR ABSENCE OF PLACED DOCUMENT | PRESENCE OR ABSENCE OF UNPRINTED PRINT JOB | SEND TO OWNER (b=B001) | ONE-SIDED MONOCHROME COPY (b=B002) | ONE-SIDED COLOR COPY (b=B003) | SCAN (b=B004) | COPY (b=B005) | PRINT ALL (b=B006) | PRINT (b=B007) | Psum |
| (s=S00) | 0 | 0 | 5 | 10 | 1 | 1 | 80 | 0 | 0 | 97 |
| (s=S01) | 0 | 1 | 0 | 0 | 0 | 0 | 0 | 57 | 40 | 97 |
| (s=S10) | 1 | 0 | 35 | 39 | 6 | 1 | 15 | 0 | 0 | 96 |
| (s=S11) | 1 | 1 | 1 | 90 | 0 | 0 | 0 | 6 | 1 | 98 |

2100 (j=501 before normalized by 100)

| STATE (s) | | BUTTON ID (b) | | | | | | |
|---|---|---|---|---|---|---|---|---|
| | PRESENCE OR ABSENCE OF PLACED DOCUMENT | PRESENCE OR ABSENCE OF UNPRINTED PRINT JOB | SEND TO OWNER (b=B001) | ONE-SIDED MONOCHROME COPY (b=B002) | ONE-SIDED COLOR COPY (b=B003) | SCAN (b=B004) | COPY (b=B005) | PRINT ALL (b=B006) | PRINT (b=B007) | Psum |
| (s=S00) | 0 | 0 | 5 | 10 | 1 | 1 | 80 | 0 | 0 | 97 |
| (s=S01) | 0 | 1 | 0 | 0 | 0 | 0 | 0 | 57 | 40 | 97 |
| (s=S10) | 1 | 0 | 45 | 39 | 6 | 1 | 15 | 0 | 0 | 106 |
| (s=S11) | 1 | 1 | 1 | 90 | 0 | 0 | 0 | 6 | 1 | 98 |

FIG. 20B

2200 (i=501 after normalized by 100)

| | STATE (s) 2021 | | | BUTTON ID (b) | | | | | | |
|---|---|---|---|---|---|---|---|---|---|---|
| | | PRESENCE OR ABSENCE OF PLACED DOCUMENT 2001 | PRESENCE OR ABSENCE OF UNPRINTED PRINT JOB 2002 2003 | SEND TO OWNER (b=B001) 2004 | ONE-SIDED MONOCHROME COPY (b=B002) 2005 | ONE-SIDED COLOR COPY (b=B003) 2006 | SCAN (b=B004) 2007 | COPY (b=B005) 2008 | PRINT ALL (b=B006) 2009 | PRINT (b=B007) 2010 |
| 2022 | (s=S00) | 0 | 0 | 5 | 10 | 1 | 1 | 80 | 0 | 0 | 97 |
| 2023 | (s=S01) | 0 | 1 | 0 | 0 | 0 | 0 | 0 | 57 | 40 | 97 |
| 2024 | (s=S10) | 1 | 0 | 42 | 36 | 5 | 0 | 14 | 0 | 0 | 97 |
| 2025 | (s=S11) | 1 | 1 | 1 | 90 | 0 | 0 | 0 | 6 | 1 | 98 |

APPARATUS, CONTROL METHOD OF THE SAME, AND STORAGE MEDIUM FOR DISPLAYING BUTTONS ON A SCREEN BASED A STATE OF THE APPARATUS

BACKGROUND

Field of the Disclosure

The present disclosure relates to a display method of a menu screen in an information processing apparatus.

Description of the Related Art

In recent years, it has become more general for image forming apparatuses (e.g., multifunction peripherals (MFPs)) installed in offices to be provided with screens. A plurality of buttons for changing settings is displayed on a screen. For example, buttons corresponding to a plurality of applications installed in an MFP are displayed as a list on a menu screen. By pressing these buttons, a user can invoke an application with a default setting, invoke an application with a specific setting, and execute processing of an application at the timing when the button is pressed.

Hereinafter, the above-described button for invoking an application with a default setting will be referred to as an application button, the above-described button for invoking an application with a specific setting will be referred to as a custom button, and the above-described button for executing processing at the timing of button press will be referred to as an immediate execution button. The custom button and the immediate execution button can also be registered by the user.

In this manner, a number of buttons are arranged on the menu screen. The user thus needs to select a desired button from among a number of buttons, which deteriorates the operability. Thus, Japanese Patent Application Laid-Open No. 2013-145946 discusses a method of helping the user to find a desired button by displaying buttons, as recommendations, that are arranged in the descending order of numbers of times the buttons are used by the user.

Nevertheless, even if the recommendation display where those buttons often used a number of times are uniformly recommended is provided as in the prior art, there is possibility that buttons may not be accurately recommended to the user due to the fact that a button desired by the user varies depending on the situation.

SUMMARY

Embodiments of the present disclosure are directed to enhancement of accuracy in recommending buttons to the user. According to embodiments of the present disclosure, an image forming apparatus that displays a plurality of buttons on an operation screen, the image forming apparatus includes a memory storing instructions and at least one processor executing the instructions causing the image forming apparatus to store numbers of usage times of the plurality of buttons in association with each state of the image forming apparatus, detect a state of the image forming apparatus and display the plurality of buttons on the operation screen based on the stored numbers of usage times of the plurality of buttons that correspond to the detected state.

Further features of the present disclosure will become apparent from the following description of exemplary embodiments with reference to the attached drawings.

BRIEF DESCRIPTION OF THE DRAWINGS

FIG. 5 illustrates an example of a button information table according to the first exemplary embodiment of the present disclosure.

FIGS. 6A1, 6A2 and 6A3 illustrate an example of a menu screen according to the first exemplary embodiment of the present disclosure.

FIGS. 6B1, 6B2 and 6B3 illustrate an example of a menu screen according to the first exemplary embodiment of the present disclosure.

FIG. 7 is a sequence diagram illustrating a flow of a series of processes of the MFP according to the first exemplary embodiment of the present disclosure.

FIGS. 10A and 10B each illustrate an example of a usage point management table according to the first exemplary embodiment of the present disclosure.

FIG. 13 illustrates an example of a usage point management table according to the second exemplary embodiment of the present disclosure.

FIG. 14 illustrates an example of a menu screen according to the second exemplary embodiment of the present disclosure.

FIG. 15 illustrates an example of a usage point management table according to a third exemplary embodiment of the present disclosure.

FIG. 17 illustrates an example of a button information table according to the third exemplary embodiment of the present disclosure.

FIGS. 18A and 18B illustrate an example of a menu screen according to the third exemplary embodiment of the present disclosure.

FIG. 19 is a flowchart illustrating processing of an MFP according to a fourth exemplary embodiment of the present disclosure.

FIGS. 20A and 20B illustrate an example of a usage point management table according to the fourth exemplary embodiment of the present disclosure.

DESCRIPTION OF THE EMBODIMENTS

Hereinafter, embodiments of the present disclosure will be described with reference to the drawings. The components described in the exemplary embodiments are mere examples, and are not intended to limit the scope of the disclosure to these.

First Exemplary Embodiment

Figure 1:
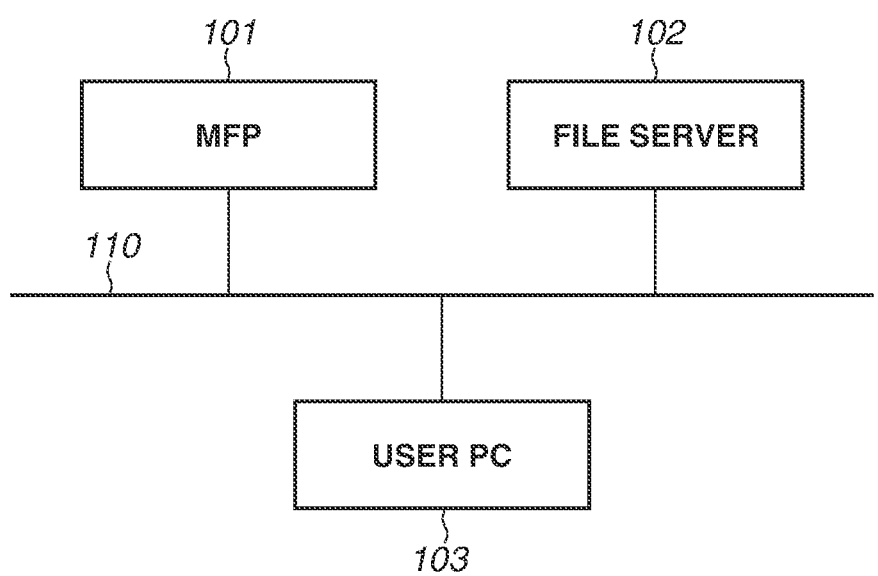
FIG. 1 is a diagram illustrating a configuration of an information processing system according to a first exemplary embodiment of the present disclosure.

FIG. 1 is a diagram illustrating an example of a system configuration of an information processing system according to the present exemplary embodiment. The information processing system includes a multifunction peripheral (MFP) 101, a file server 102, and a user personal computer (PC) 103, which are connected to each other via a local area network (LAN) 110. The apparatuses on the LAN 110 can communicate with each other. FIG. 1 illustrates an example of a typical network configuration, and the apparatuses may be connected to a wide area network (WAN) (not illustrated) instead of the LAN 110. The number of MFPs 101, the number of file servers 102, and the number of user PCs 103 are not limited to one, and the numbers may be increased and decreased.

The MFP 101 is an example of an image forming apparatus having a scanner function and a printer function. The file server 102 is a server including a network folder accessible from the MFP 101 and the user PC 103, and can be a destination to which image data scanned by the MFP 101 is transmitted. The user PC 103 is an example of an information processing apparatus. The user PC 103 is not limited to a PC and may be a mobile terminal such as a smartphone. The user PC 103 is a PC to be used by the user for performing a business operation. In response to an operation of the user, the user PC 103 can send print data to the MFP 101 using a printer driver.

Figure 2:
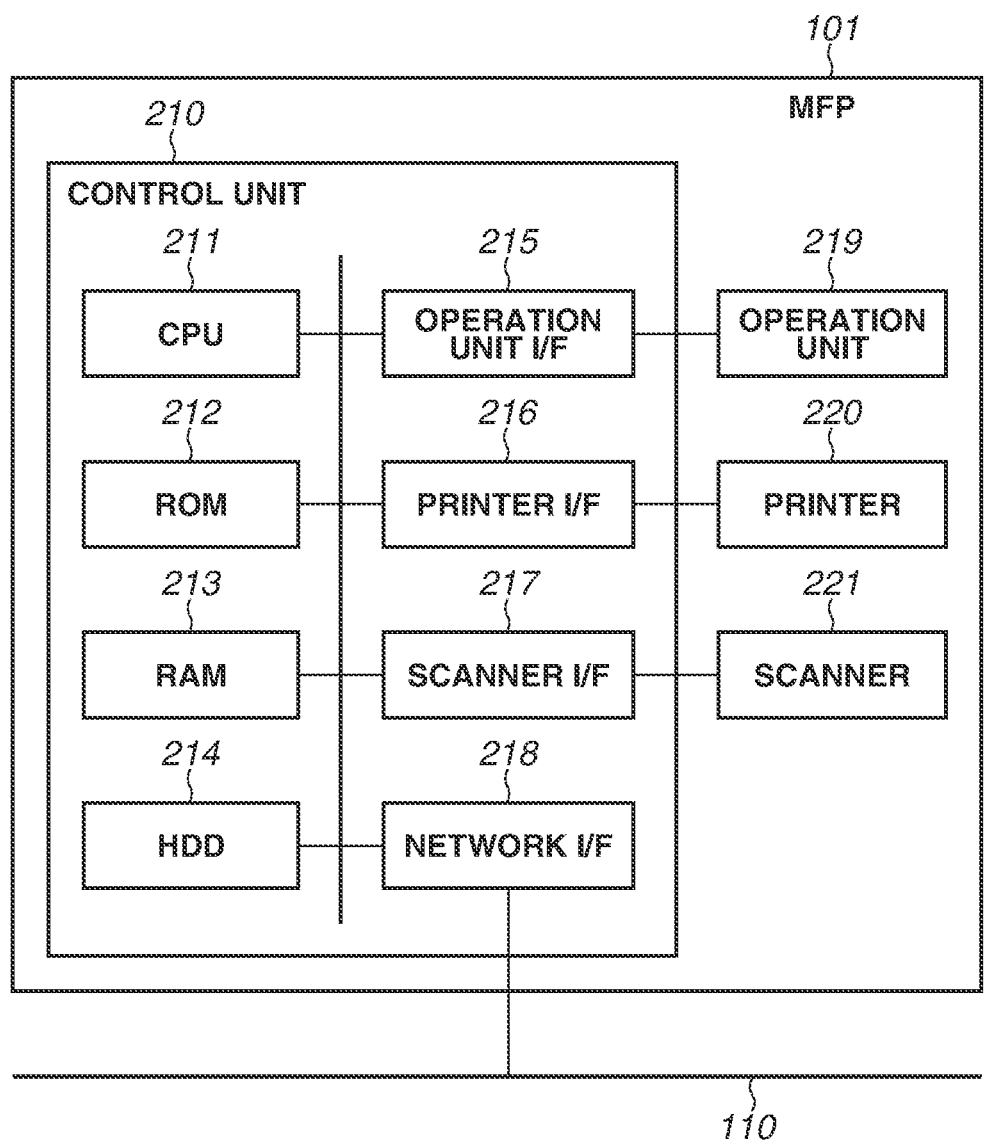
FIG. 2 is a block diagram illustrating a hardware configuration of a multifunction peripheral (MFP) according to the first exemplary embodiment of the present disclosure.

FIG. 2 is a block diagram illustrating a hardware configuration of the MFP 101. A control unit 210 including a central processing unit (CPU) 211 controls operations of the entire MFP 101. The CPU 211 executes various types of control processing such as reading control and transmission control by reading control programs stored in a read-only memory (ROM) 212 and a hard disk drive (HDD) 214. A random access memory (RAM) 213 is used as a temporary storage region such as a main memory and a work area of the CPU 211. The HDD 214 stores image data and various programs.

An operation unit interface (I/F) 215 connects an operation unit 219 and the control unit 210. The operation unit 219 includes a liquid crystal display unit providing an operation screen having a touch panel function, and a keyboard. A printer I/F 216 connects a printer 220 and the control unit 210. Image data to be printed by the printer 220 is transferred to the printer 220 from the control unit 210 via the printer I/F 216 and is printed onto a recording medium by the printer 220. A scanner I/F 217 connects a scanner 221 and the control unit 210. The scanner 221 generates image data by reading an image on a document and inputs the generated image data to the control unit 210 via the scanner I/F 217. A network I/F 218 connects the control unit 210 (the MFP 101) to the LAN 110. The network I/F 218 transmits and receives various types of information to and from another apparatus on the LAN 110.

Figure 3:
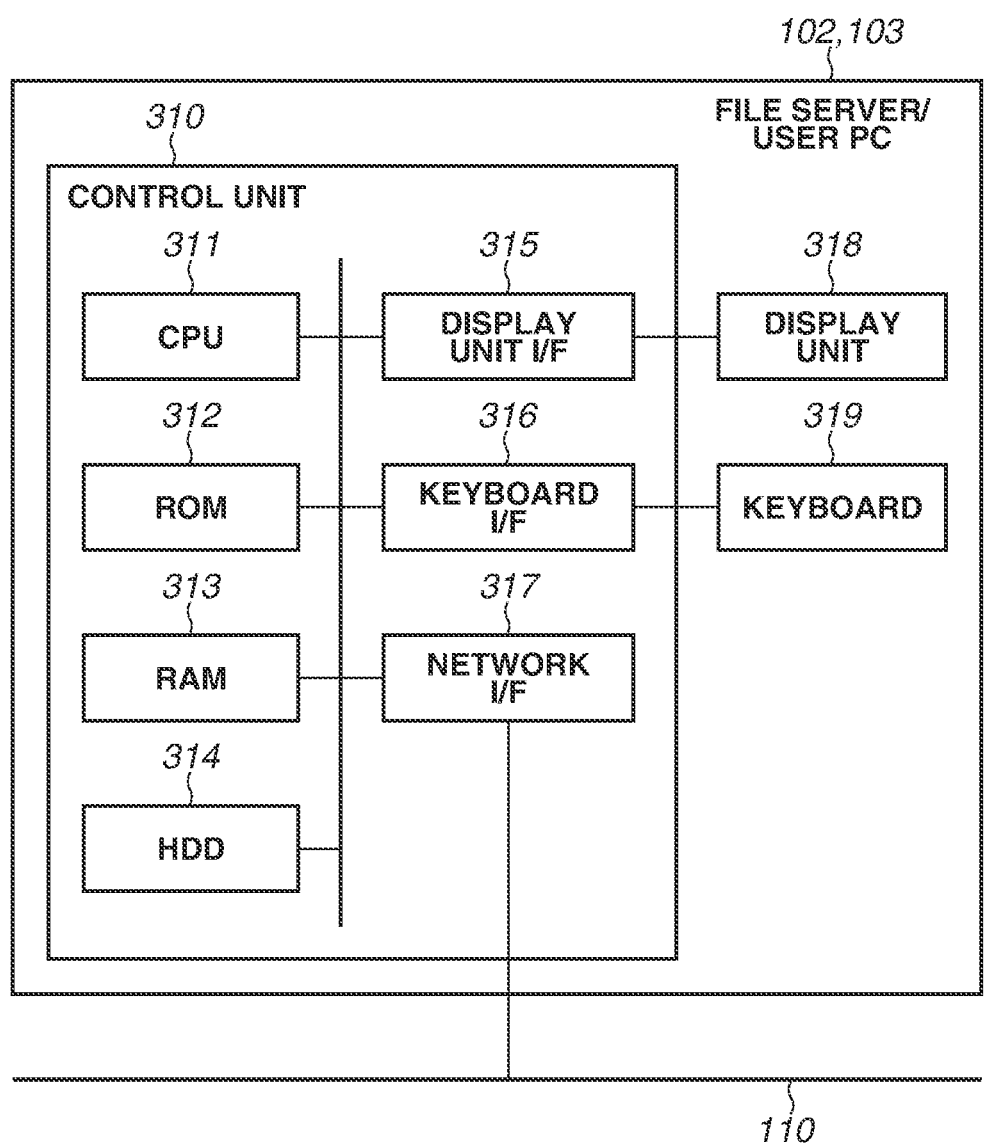
FIG. 3 is a block diagram illustrating a hardware configuration of a file server and a user personal computer (PC) according to the first exemplary embodiment of the present disclosure.

FIG. 3 is a block diagram illustrating a hardware configuration of the file server 102 and the user PC 103. A control unit 310 including a CPU 311 controls operations of the entire apparatus. The CPU 311 executes various types of control processing by reading control programs stored in a ROM 312 and an HDD 314. A RAM 313 is used as a temporary storage region such as a main memory and a work area of the CPU 311. The HDD 314 stores various programs and data. A display unit I/F 315 connects a display unit 318 and the control unit 310. A keyboard I/F 316 connects a keyboard 319 and the control unit 310. The CPU 311 recognizes an instruction issued from the user via the keyboard 319 and shifts a screen to be displayed on the display unit 318 in accordance with the recognized instruction. A network I/F 317 connects the control unit 310 to the LAN 110. The network I/F 317 transmits and receives various types of information to and from another apparatus on the LAN 110.

Figure 4:
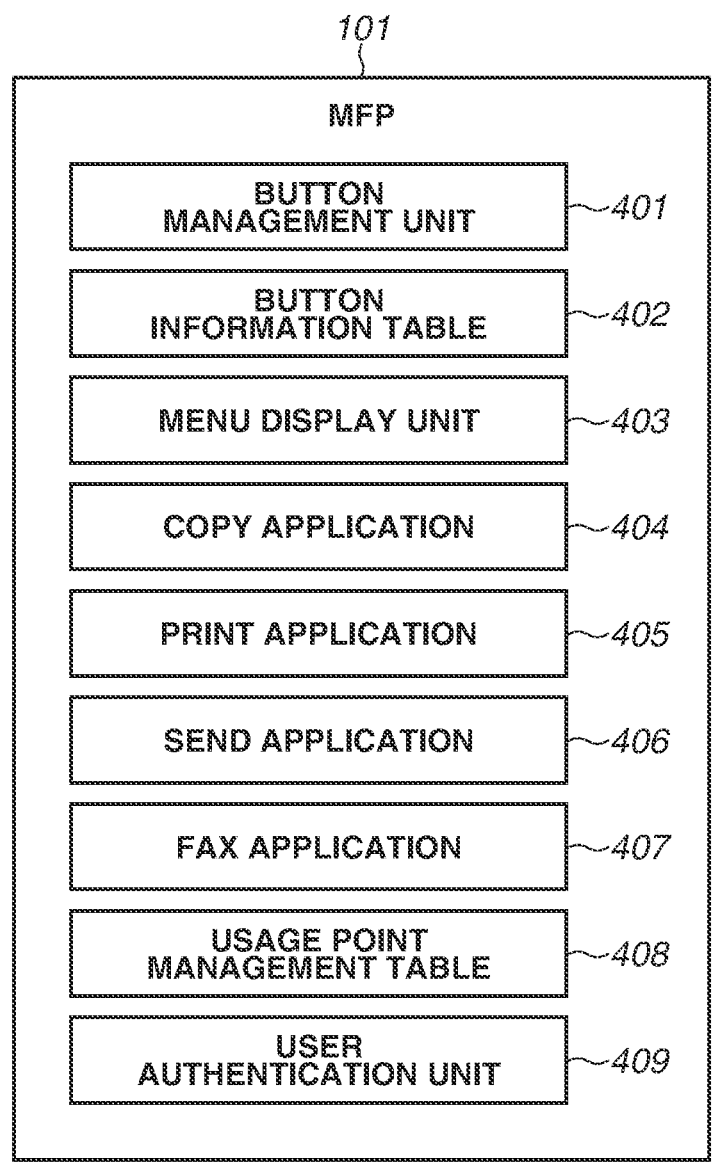
FIG. 4 is a block diagram illustrating a software configuration of the MFP according to the first exemplary embodiment of the present disclosure.

FIG. 4 is a software configuration diagram of the MFP 101 according to the present exemplary embodiment. The following processing is executed by the CPU 211 loading a program stored in the HDD 214 of the MFP 101 onto the RAM 213 and executing the program.

A button management unit 401 manages a button to be displayed on an operation screen including a menu screen of the MFP 101. A button information table 402 is a table storing information regarding a button to be displayed on the menu screen of the MFP 101 and is recorded on the RAM 213 or the HDD 214. A menu display unit 403 displays a menu screen where buttons are arranged on the operation unit 219. The menu display unit 403 displays the menu screen based on button information stored in the button information table 402. A copy application 404 is an application providing a copy function. A print application 405 is an application providing a print function. The print application 405 has a function of once storing a print job transmitted from an external device such as the PC 103 in accordance with a user instruction, onto the HDD 214 without executing the print job at the reception timing and then performing print processing upon additionally receiving an instruction from the user on the MFP 101 (hereinafter, referred to as reserved printing). A send application 406 is an application providing a function of sending scanned image data. A network folder of the file server 102 can be designated as one of transmission destinations. A fax application 407 is an application providing a fax function. The applications 404 to 407 are examples, and applications are not limited to these. Another application may be installed on the MFP 101. A user authentication unit 409 identifies and authenticates a user who uses the MFP 101.

A usage point management table 408 manages a usage point that is based on a usage frequency of a button displayed on the menu screen for each user and for each state of the MFP 101. For example, a state of the MFP 101 refers to a state in which the MFP 101 holds an unexecuted print job (reserved print job), a state in which a document is placed on the scanner 221 of the MFP 101, a state in which the MFP 101 holds an unexecuted print job and a document is placed on the scanner 221, and a default state (i.e., state in which the MFP 101 does not hold a reserved print job and a document is not placed on the scanner 221). In accordance with such a state of the MFP 101, a button desired by the user differs. For example, in a state in which a document is placed on the scanner 221 of the MFP 101, the user is highly likely to desire an application button that is based on processing of scanning a document.

In the present exemplary embodiment, a usage point that is based on the number of usage times of a button is stored for each state of the MFP 101, and buttons are displayed (recommended) in the descending order of usage points in each state. With this configuration, it is possible to recommend buttons to the user more accurately as compared with the case of uniformly recommending buttons using only the numbers of usage times of buttons without considering the state of the MFP 101. Although, in the following description, two examples, an example where a placed document is present or absent and an example where an unexecuted print job is present or absent, are used as examples of the state of the MFP 101, the state of the MFP 101 is not limited to these. For example, a state as to whether the MFP 101 holds a received FAX document may be used as the state of the MFP 101.

FIG. 5 illustrates an example of the button information table 402 according to the present exemplary embodiment. One row defines one button. In a button information table 500 illustrated in FIG. 5, seven buttons corresponding to rows 511 to 517 are defined as an example.

The button information table 402 includes four columns corresponding to columns 501 to 504. A button ID 501 column is a column defining an identifier for uniquely identifying a button. A button name 502 column is a column defining a name to be displayed in a button. An invoked application 503 column is a column defining an application to be invoked when a corresponding button is selected by the user. A setting value 504 column is a column defining a setting value to be allocated as a parameter when an application is invoked. A button (e.g., button corresponding to the row 511) with a value set on the setting value 504 column will be hereinafter referred to as a custom button. If a custom button is pressed, the invoked application 503 is opened in a state in which the setting value 504 is reflected. The custom button is created by the user determining a desired setting value and registering the setting value in the MFP 101, for example. On the other hand, buttons (e.g., button corresponding to the row 514) without values set as the setting value 504 are buttons for invoking applications in a default state without allocating parameters (hereinafter, referred to as application buttons). If these buttons are pressed in a state in which processing is executable, the processing may be immediately executed. A "send to owner" button having "B001" as a button ID is a button for sending a scanned document to a PC of the user. A "print all" button having "B006" as a button ID is a button for collectively performing print processing of a plurality of print jobs that has been transmitted by the user and stored in the MFP 101. Information included in a button information table is not limited to these types of information, and other types of information may be included. If button information different for each user is stored, user information may be included, or information indicating an expiration date of a button may be included. In this case, necessary information can be managed for each button by adding a column to the button information table 402.

FIGS. 6A1 to 6A3 and 6B1 to 6B3 each illustrate an example of a menu screen of the MFP 101 according to the present exemplary embodiment.

Screens 610 and 611 indicate a simple overview of the menu screen. If the user authentication unit 409 has identified a user of the MFP 101 by login processing, a user name of the identified user is displayed in a user name display region 601. In the present exemplary embodiment, the menu screen includes two pages. The first page corresponds to the screen 610 and the second page corresponds to the screen 611. To change a page, the user operates a page scroll bar 602. Button display regions 603 to 609 are regions in which application buttons or custom buttons are displayed in order from a button having the highest priority. Buttons are sequentially displayed in such a manner that a button with the highest display priority is displayed in the button region 603, a button with the second highest display priority is displayed in the button region 604 and so on.

Pieces of display priority information of buttons will be described with reference to FIGS. 10A and 10B. FIGS. 10A and 10B illustrate the usage point management table 408 according to the present exemplary embodiment, which is used for managing a usage point that is based on a button usage history of the user in each state of the MFP 101. A usage point is a point to which a value is added each time a button is pressed or used. The usage point is changed in accordance with a predetermined rule. The greater the usage points, the higher the display priority of a button to be displayed on the menu screen. Although the following description will be given of an example in which the number of usage point management tables 408 corresponds to the number of users, and the usage point management tables 408 are managed for the respective users, usage histories of all users may be collectively managed using one table. The description will be given using usage point management tables 1000, 1100, and 1200 as specific examples. In the tables, (j=0), (j=500), and (j=501) indicate the numbers of times jobs have been executed so far. The usage point management table 1000 (j=0) is a management table in a default state in which no job has ever been executed, and default usage points are set in the usage point management table 1000. The usage point management table 1100 (j=500) is a management table in a state in which jobs have been executed 500 times.

The detailed description of the tables will be given using the usage point management table 1000. A state 1001 column, a document placement 1002 column, and an unprinted job 1003 column are columns indicating the state of the MFP 101. If "0" is set on the document placement 1002 column, the document placement 1002 column indicates that no document is placed on the MFP 101. If "1" is set on the document placement 1002 column, the document placement 1002 column indicates that a document is placed on the MFP 101. In a similar manner, if "0" is set on the unprinted job 1003 column, the unprinted job 1003 column indicates that the MFP 101 does not hold any unprinted print job. If "1" is set on the unprinted job 1003 column, the unprinted job 1003 column indicates that the MFP 101 holds an unprinted print job. Based on these states, the state of the MFP 101 is defined on the state 1001 column. For example, in a case where the MFP 101 is in a state in which "no document is placed" and "no unprinted print job is held" as indicated on a row 1033, the state is defined as "S00".

On button 1004 to 1010 columns, pieces of information regarding respective buttons are indicated, and usage points that are based on the numbers of usage times corresponding to the respective states are indicated. In this example, the buttons defined in the button information table illustrated in FIG. 5 are indicated. If a button is pressed or executed, a predetermined value is added to the usage point of the button that corresponds to the state of the MFP 101 at the time when the button is used. Because the usage point management table 1000 is in a default state, default usage points are indicated. The default usage points may be preset at the time of factory shipment, may be set by an administrator of the MFP 101, or may be made settable by the user. The display priority of a button with higher usage points becomes higher. In other words, the display priority of a button with a higher usage frequency becomes higher. For example, in a case where the state of the MFP 101 is a state where "a document is placed" and "no unprinted print job is held" (s=S10), high usage points are set by default for buttons for performing scan processing such as a "send to owner" button and a "one-sided monochrome copy" button. Because the user has placed a document on a scanner, the user is highly likely to desire a button for performing scan processing. The display priorities of such buttons are therefore made high. In this manner, the display priority of a button varies depending on the state of the MFP 101, and if the state of the MFP 101 changes, the arrangement order of buttons displayed on the menu screen also changes.

Using the usage point management table 1100 indicating usage points in a state in which jobs have been executed 500 times, as an example, the description will be given of button display priority in a case where the state of the MFP 101 is a state where "a document is placed" and "no unprinted print job is held" (s=S10). In this case, the display priorities of the buttons are set according to the descending order of usage points so that the "one-sided monochrome copy" button, the "send to owner" button and a "copy" button, which have higher usage points, are arranged in this order from the left of the menu screen. In this manner, the number of usage times of each button is managed for each state of the MFP 101, and the buttons are displayed based on the managed numbers of usage times. It is therefore possible to accurately recommend buttons to the user.

The description will return to FIGS. 6A1 to 6A3 and 6B1 to 6B3. A specific example of a menu screen to be displayed based on the usage point management table 408 will be described. Screens 620 and 621 indicate an example of a menu screen displayed based on the usage point management table 1000 (j=0) in a case where the state of the MFP 101 is a state where "no document is placed" and "no unprinted print job is held" (s=S00). Screens 630 and 631 indicate an example of a menu screen displayed based on the usage point management table 1000 (j=0) in a case where the state is S01. Screens 640 and 641 indicate an example of a menu screen displayed based on the usage point management table 1100 (j=500) in a case where the state is S00. Although the state of the MFP 101 is the same, the arrangement order of buttons on the screens 640 and 641 differs from that on the screens 620 and 621, and the "copy" button with high usage frequency is displayed in the first place on the screens 640 and 641. Screens 650 and 651 indicate an example of a menu screen displayed based on the usage point management table 1100 (j=500) in a case where the state is S10. Screens 660 and 661 indicate an example of a menu screen displayed based on the usage point management table 1200 (j=501) in a case where the state is S10. The buttons displayed on each of the menu screens illustrated in FIGS. 6A1 to 6A3 and 6B1 to 6B3 correspond to the seven buttons from the buttons 511 to 517 defined in the button information table 402 illustrated in FIG. 5. As defined in the button information table 402, the buttons 511, 512, 513, and 516 are custom buttons, and the buttons 514, 515, and 517 are application buttons. Custom buttons and application buttons are made easily distinguishable by providing a visual difference such as the presence or absence of the display of a setting value. The visual difference is not limited to this. Custom buttons and application buttons are made easily distinguishable by changing the shapes or colors of buttons. In the present exemplary embodiment, an icon representing an application and an application name are displayed in an application button, and an icon representing an application to be executed, a button name, and a summary of setting values are displayed in a custom button.

In the present exemplary embodiment, buttons are used as components for invoking applications, but another component may be used. For example, applications may be displayed using a list. In this case, an application with the highest priority is displayed at the top, and an application with the next highest priority is displayed as the priority level in the list goes down by one.

Figure 22:
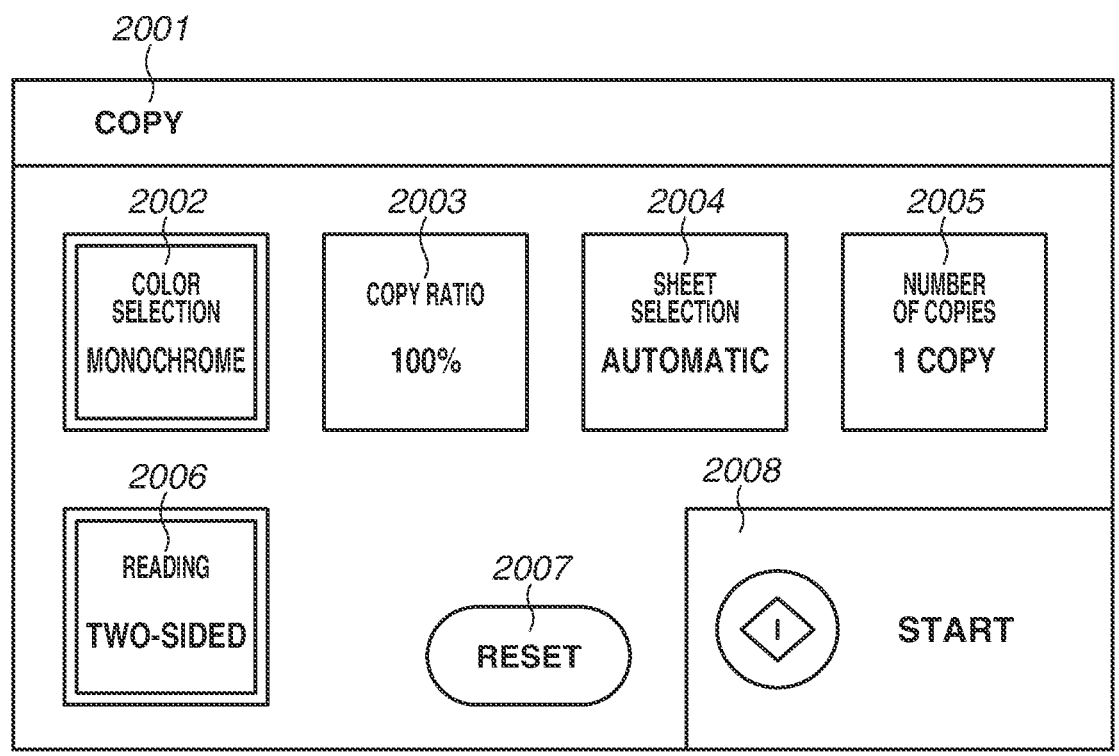
FIG. 22 illustrates an example of an application setting screen according to the first exemplary embodiment of the present disclosure.

FIG. 22 illustrates an example of a setting screen of an application to be invoked when the user presses the button 512 on the menu screen. Because the invoked application 503 of the button 512 is defined as the "copy application 404", the copy application 404 is invoked. In addition, FIG. 22 illustrates a state in which setting values defined in the setting value 504 column corresponding to the button 512 are set.

A label 2001 displays the name of the invoked application. Regions 2002 to 2006 display the current setting values of the copy application 404. Because the setting values defined in the setting value 504 column corresponding to the button 512 are "1 copy", "monochrome", and "two-sided", "1 copy" is displayed in the region 2005, "monochrome" is displayed in the region 2002, and "two-sided" is displayed in the region 2006. As setting values not defined in the setting value 504 column, default values are displayed in the regions 2003 and 2004.

Among the regions 2002 to 2006, regions in which setting values changed from default values are set are made distinguishable from regions in which default values are set, by defining the former regions by double line frames. In FIG. 22, because setting values different from default values are set in the region 2002 (default value of color selection is "color") and the region 2006 (default value of reading is "one-sided"), the regions 2002 and 2006 are defined by double line frames. Because "1 copy" set on the setting value 504 column corresponding to the button 512 is the same as a default value of the number of copies, the region 2005 is defined by a single line frame. In this example, regions are made distinguishable according to the numbers of lines of frames of buttons, but regions may be made distinguishable according to the colors or shapes of buttons.

If each of the regions 2002 to 2006 is pressed, a dialog for changing a corresponding setting value is displayed.

A reset button 2007 is a button for returning each setting value to a default value. A button 2008 is a button for starting a job using the currently-set setting value.

FIG. 7 is a sequence diagram illustrating a flow of a series of processes according to the present exemplary embodiment. FIG. 7 illustrates an example of a flow of processing including button registration, display of a menu screen (buttons) and application invocation triggered by pressing of a button. By the CPU 211 loading a program stored in the HDD 214 of the MFP 101 onto the RAM 213 and executing the program, processing in the sequence diagram illustrated in FIG. 7 and each step of a flowchart, which will be described below, are executed.

First of all, in step S701, each application (404 to 407) preliminarily issues a button registration instruction to the button management unit 401. A registration timing of buttons may be any timing as long as buttons are registered before the menu screen is displayed. For example, buttons may be registered at the time of start-up of the MFP 101 or at the time of start-up of an application. The button registration instruction includes registration of pieces of information defined in the columns (button name, invoked application, and setting value) of the button information table 402.

In step S702, the button management unit 401 receives the button registration instruction and stores received button information in the button information table 402.

In step S703, the menu display unit 403 receives a display instruction of a menu screen from the user. In step S704, the menu display unit 403 issues a button information acquisition request to the button management unit 401. At this time, if a user has logged in to the MFP 101, button information associated with the login user is acquired. In step S705, the button management unit 401 returns button information to the menu display unit 403 as a response to the button information acquisition request issued in step S704. In step S706, the menu display unit 403 displays a menu screen on the operation unit 219 based on the button information received in step S705.

In step S707, the menu display unit 403 receives an operation (pressing of a button) performed by the user. In step S708, the menu display unit 403 determines an application to be invoked and a parameter to be allocated in the invocation based on the user operation received in step S707. In step S709, the menu display unit 403 invokes an application in accordance with the determination made in step S708. In step S710, the invoked application performs processing in accordance with the parameter allocated in the invocation.

Figure 8:
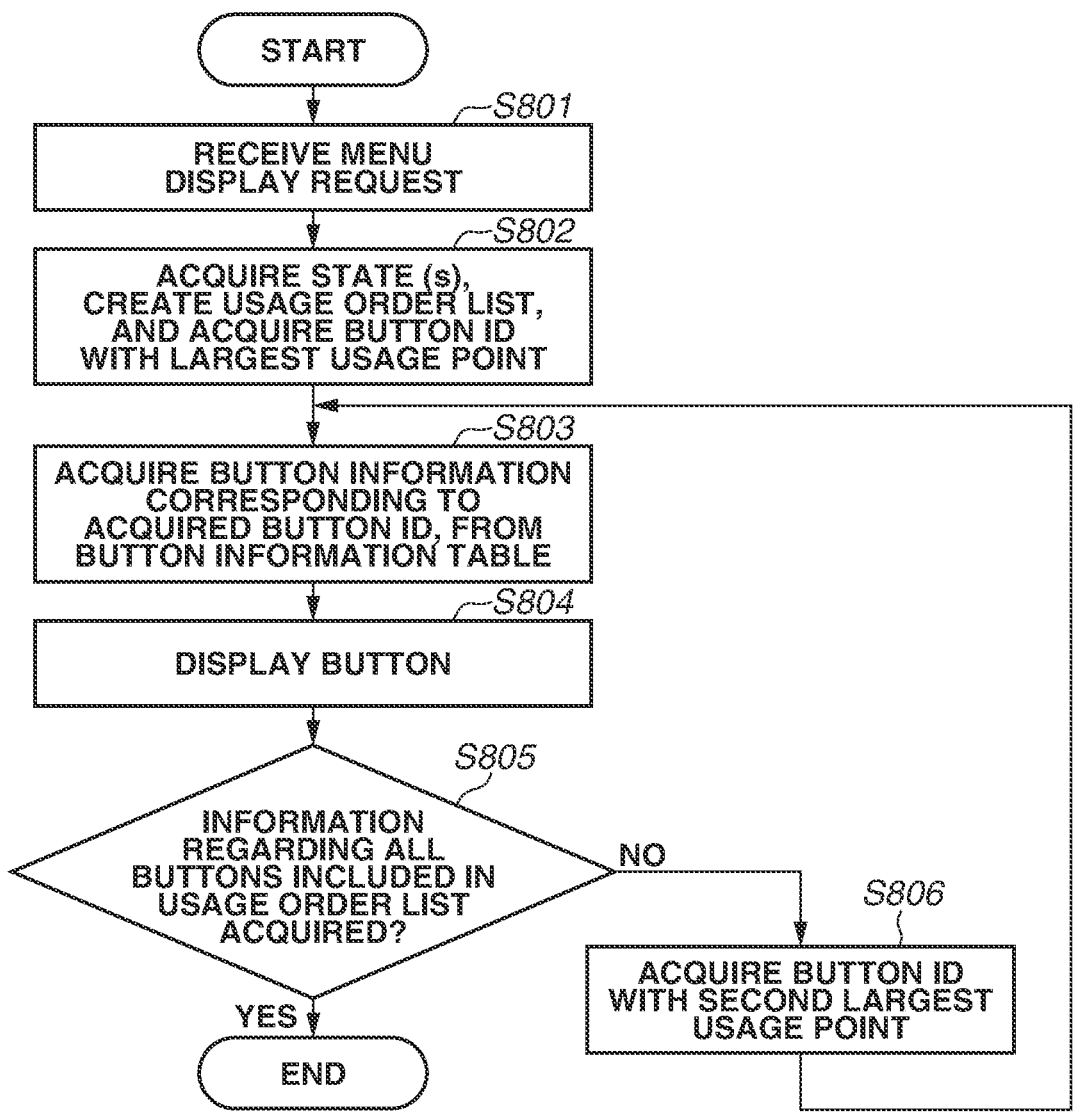
FIG. 8 is a flowchart illustrating processing of the MFP according to the first exemplary embodiment of the present disclosure.

FIG. 8 is a flowchart illustrating processing of the MFP 101 according to the present exemplary embodiment. FIG. 8 illustrates processing to be performed from when a display request for a menu screen is received from the user to when the menu screen is displayed on the operation unit 219. The flowchart illustrated in FIG. 8 corresponds to the processing in steps S703 to S706 in the sequence diagram illustrated in FIG. 7.

In step S801, the menu display unit 403 receives a display request for a menu screen. The display request for a menu screen is issued by, for example, an operation of the user for logging in to the MFP 101, an operation of the user pressing a button for displaying a menu screen, and a system notification (e.g., a menu screen is displayed if a user operation has not been performed for a certain period of time). Next, in step S802, the menu display unit 403 acquires the state of the MFP 101. Referring to the acquired state of the MFP 101 and the usage point management table 408 illustrated in FIGS. 10A and 10B, a usage order list is created. The usage order list is a list in which button IDs are arranged in the descending order of usage points.

The description will be given using an example case where jobs have been executed 500 times (j=500) and the usage point management table 1100 illustrated in FIG. 10A is used. If the acquired state of the MFP 101 is S10, buttons are arranged in the descending order of usage points by reference to the row 1041. The usage order list created at this time is as follows.

Usage order list={B002, B001, B005, B003, B004, B006, B007}

The menu display unit 403 acquires a button ID with the largest usage points (in this example, B002) from the created usage order list.

Next, in step S803, the menu display unit 403 acquires information regarding the button ID acquired in step S802 from the button information table 402. In this example, the menu display unit 403 acquires button information corresponding to the button ID (b=B002) from the button information table 402.

Next, in step S804, the menu display unit 403 displays the acquired information regarding the button ID (b=B002). The menu display unit 403 thereby displays the custom button 512 "one-sided monochrome copy" in the first place (button display region 603 in FIG. 6A1) of the menu screen as indicated by the screen 650 illustrated in FIG. 6B2.

Next, in step S805, the menu display unit 403 checks whether pieces of information regarding all button IDs included in the usage order list acquired in step S802 have been acquired. If the pieces of information have been acquired (YES in step S805), the processing is ended. If the pieces of information have not been acquired (NO in step S805), the processing proceeds to step S806. At this time, because only information regarding the button ID (b=B002) has been acquired, the processing proceeds to step S806.

In step S806, the menu display unit 403 acquires a button ID (b=B001) with the second highest usage points. The menu display unit 403 executes the processing in step S803 again. This time, the menu display unit 403 acquires button information corresponding to the button ID (b=B001) from the button information table 402. Then, in step S804, the menu display unit 403 displays the acquired information regarding the button ID (b=B001). The custom button 511 "send to owner" is thereby displayed in the second place (button display region 604 in FIG. 6A1) of the menu screen as indicated by the screen 650 illustrated in FIG. 6B2. In a similar manner, button IDs are sequentially acquired from the usage order list, and buttons are sequentially displayed in the button display region 605, 606, and 607 illustrated in FIG. 6A1. If the display of buttons up to a button with a button ID (b=B007) is ended, then in step S805, the menu display unit 403 determines that pieces of information regarding all buttons included in the usage order list have been acquired (YES in step S805), and the processing is ended. By the above-described flow, screens as indicated by the menu screens illustrated in FIGS. 6A1 to 6A3 and 6B1 and 6B3 are displayed. In this example, a usage point directly functions as priority information, but display priority may be separately calculated using a usage point.

Figure 9:
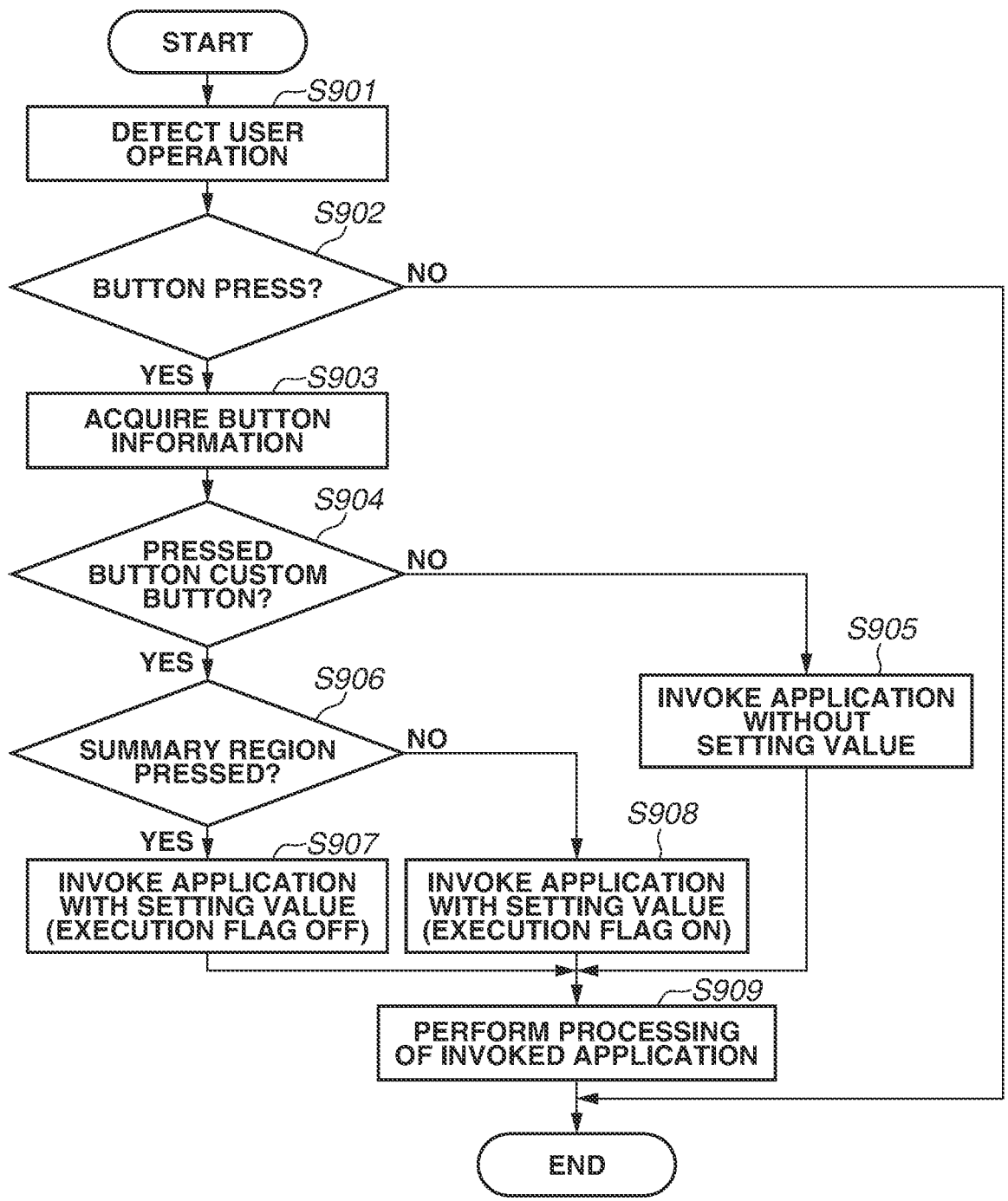
FIG. 9 is a flowchart illustrating processing of the MFP according to the first exemplary embodiment of the present disclosure.

FIG. 9 is a flowchart illustrating processing of the MFP 101 according to the present exemplary embodiment. The description will be given of processing of detecting a user operation on the menu screen displayed in the flowchart illustrated in FIG. 8 and invoking an application in accordance with the user operation. The flowchart illustrated in FIG. 9 corresponds to the processing in steps S707 to S710 in the sequence diagram illustrated in FIG. 7.

In step S901, the menu display unit 403 detects a user operation performed on the menu screen. In step S902, the menu display unit 403 determines whether the user operation detected in step S901 is a button pressing operation. If the menu display unit 403 determines that the user operation is a button pressing operation (YES in step S902), the processing proceeds to step S903. If the menu display unit 403 determines that the user operation is not a button pressing operation (NO in step S902), the processing is ended. In the following description, a button pressed by the user in step S901 will be referred to as a "pressed button".

In step S903, the menu display unit 403 uniquely identifies a button based on the button ID 501 associated with the pressed button, and acquires button information from the button information table 402. When the term "button information" is simply used in the following description, the "button information" refers to the button information acquired in step S903.

In step S904, the menu display unit 403 determines whether the pressed button is a custom button. It is determined whether the pressed button is a custom button based on whether a value is defined in the setting value 504 column. If the pressed button is a custom button, the processing proceeds to step S906. If the pressed button is not a custom button, the processing proceeds to step S905.

In step S905, the menu display unit 403 invokes an application corresponding to the pressed button without allocating a parameter thereto. The invoked application is an application defined in the invoked application 503 column of the button information. After that, the processing proceeds to step S909. The processing in step S909 will be described below.

In step S906, the menu display unit 403 determines a region of a button that has been pressed by the user in step S901. As an example of determination, the description will be given using the button 511 illustrated in FIGS. 6A1 to 6A3 and 6B1 to 6B3. If a region pressed by the user is a "setting region" (i.e., summary display portion) (YES in step S906), the processing proceeds to step S907. If a region pressed by the user is an "execution region" (i.e., region other than the "setting region") (NO in step S906), the processing proceeds to step S908.

In step S907, the menu display unit 403 invokes an application corresponding to the pressed button while allocating a parameter thereto. The invoked application is an application defined in the invoked application 503 column of the button information. The applied parameter includes a setting value defined in the setting value 504 column of the button information and an instruction for displaying a setting screen without executing a job at the time of invocation (execution flag OFF). After that, the processing proceeds to step S909.

In step S908, the menu display unit 403 invokes an application corresponding to the pressed button while allocating a parameter. The invoked application is an application defined in the invoked application 503 column of the button information. The applied parameter includes a setting value defined in the setting value 504 column of the button information, and an instruction for starting execution of a job at the time of invocation (execution flag ON). After that, the processing proceeds to step S909.

In step S909, the invoked application performs processing in accordance with the parameter allocated at the time of invocation. For example, if no parameter is allocated, the application is displayed in a default state. In other words, a screen that is set to the default setting of the application is displayed. The default setting of the application can be set in accordance with an operation performed by a user having an authority such as an administrator. Alternatively, if a setting value and "execution flag OFF" are allocated as parameters, the application displays a setting screen on which the setting value is reflected. If a setting value and "execution flag ON" are allocated as parameters, the application starts execution of a job with the allocated setting value. In this manner, the custom button allows switching of an operation between an operation of immediately executing processing and an operation of opening a setting screen depending on the pressed region.

Figure 11:
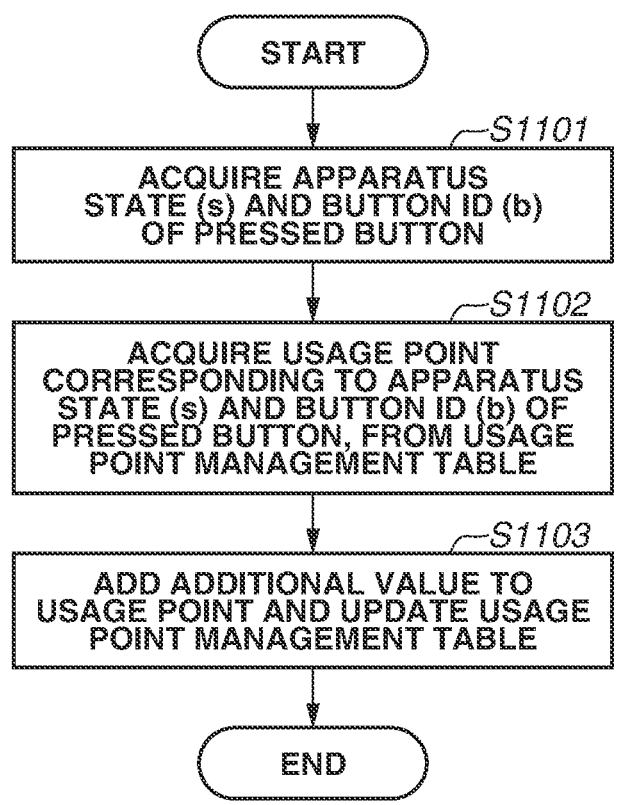
FIG. 11 is a flowchart illustrating update processing of the usage point management table according to the first exemplary embodiment of the present disclosure.

FIG. 11 is a flowchart illustrating update processing of a usage point management table according to the present exemplary embodiment. A specific description will be given assuming that the user has executed jobs 500 times (j=500) and a button with a button ID (b=B001) is pressed in a case where the apparatus is in the state (s) where "a document is placed" and "no unprinted print job is held" (S10) with reference to the usage point management table 1100. The number of execution times (j=500) is an example, and the processing illustrated in FIG. 11 is processing performed if the number of execution times is any number such as "j=0" or "j=501".

In step S1101, if the pressing or execution of a button is detected, the button management unit 401 acquires the state (s) of the apparatus, S10, at the time when the button is pressed, and a button ID (b=B001) of the pressed button. Next, in step S1102, the button management unit 401 acquires, from the usage point management table 408, usage points of the button ID (b=B001) corresponding to the state (s) of the apparatus, S10 (in this example, 77 usage points are acquired referring to the usage point management table 1100).

In step S1103, the usage point management table 408 adds an additional value of 10 to the acquired usage points and updates the usage points of the button ID (b=B001) corresponding to the state (s) "S10" to 87 (usage points=87). The usage point management table 1100 is accordingly updated to the usage point management table 1200 (j=501). By the update, buttons rearranged on the menu screens 650 and 651 illustrated in FIG. 6B2 are rearranged on the menu screens 660 and 661 illustrated in FIG. 6B3. Since the "send to owner" button displayed in the second place on the screen 650 is used, the usage points of the "send to owner" button exceeds the usage points of the "one-sided monochrome copy" button displayed in the first place. Thus, on the screen 660, the display orders of the two buttons are switched.

According to the above-described exemplary embodiment, the numbers of usage times of buttons can be stored for each state of an MFP, and a button with a large number of usage times in a detected state of the MFP can be displayed at the top in an arrangement order of buttons. More specifically, frequently-used buttons are stored in association with each operation performed by the user on the MFP, and recommended buttons are displayed based on the stored buttons. It is therefore possible to recommend buttons more accurately as compared with the case of uniformly recommending buttons using only the number of usage times.

Second Exemplary Embodiment

In the first exemplary embodiment, a button with a large number of usage times in a state of the MFP 101 is preferentially displayed in a single uniform manner based on the usage point management table 408. In the present exemplary embodiment, the description will be given of an example of preferentially displaying a specific button in a specific state of the MFP 101 irrespective of the number of usage times of the button, instead of preferentially displaying a button with a large number of usage times in a single uniform manner. For example, in a state in which the MFP 101 holds an unprinted print job, a button for executing a print job is preferentially displayed irrespective of the number of usage times of the button. With this configuration, it is possible to make the user aware of the existence of an unprinted print job. In the present exemplary embodiment, a specific description will be given using an example case where, in the state (S01) in which the MFP 101 holds an unprinted print job and no document is placed, the application button 517, "print", and the custom button 516, "print all", which are print job execution buttons, are always displayed most preferentially irrespective of the usage frequencies. FIG. 13 illustrates a usage point management table 1300 (j=1000) according to the present exemplary embodiment. Because the basic configuration of the present exemplary embodiment is similar to that of the first exemplary embodiment, only a difference will be described.

Figure 12:
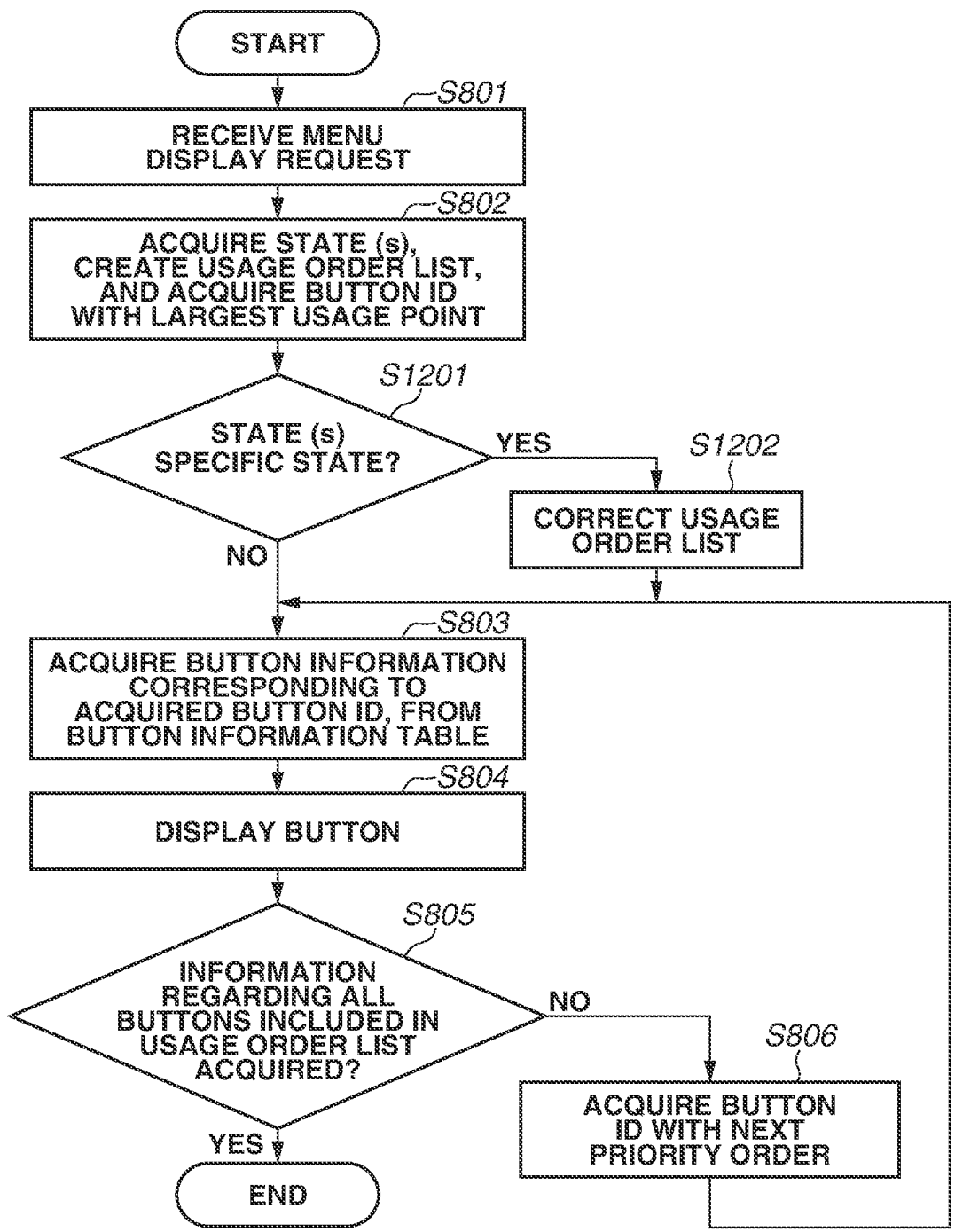
FIG. 12 is a flowchart illustrating processing of an MFP according to a second exemplary embodiment of the present disclosure.

FIG. 12 is a flowchart illustrating processing of the MFP 101 according to the present exemplary embodiment. FIG. 12 illustrates processing to be performed from when a display request for a menu screen is received from the user to when the menu screen is displayed on the operation unit 219. Because the basic configuration of the flowchart is similar to the flowchart illustrated in FIG. 8, only a difference will be described.

In step S802, the menu display unit 403 acquires the state of the apparatus and creates a usage order list. Because the state of the apparatus is S01 at this time, the menu display unit 403 creates a usage order list referring to a row 1314 of the usage point management table 1300. Specifically, a usage order list is created as follows.

Usage order list={B002, B001, B006, B007, B005, B003, B004}

The menu display unit 403 acquires the created usage order list and a button ID (b=B002) with the largest usage points. Then, the processing proceeds to step S1201.

In step S1201, the menu display unit 403 determines whether the state (s) acquired in step S802 is S01. If the acquired state (s) is not S01 (NO in step S1201), the processing proceeds to step S803. If the menu display unit 403 determines in step S1201 that the acquired state (s) is S01 (YES in step S1201), the processing proceeds to step S1202.

In step S1202, the menu display unit 403 corrects the usage order list in such a manner that the application button 517 "print" and the custom button 516 "print all", which are print job execution buttons, are displayed most preferentially. Specifically, by moving the button ID (b=B007) of the application button 517 "print" and the button ID(b B006) of the custom button 516 "print all" to the top of the usage order list, the menu display unit 403 corrects the usage order list as follows.

Usage order list={B006, B007, B002, B001, B005, B003, B004}

Then, the menu display unit 403 acquires the button ID (b=B006) displayed in the first place in the list, and the processing proceeds to step S803.

By the above-described flowchart, a menu screen on which buttons for executing a print job are preferentially displayed is displayed as illustrated in FIG. 14. In this manner, if the MFP is in a specific state, a specific button can be always preferentially displayed irrespective of the usage frequency, instead of preferentially displaying a button in a single uniform manner based on the usage histories of the button. With this configuration, the user can be notified that the MFP is in the specific state.

Third Exemplary Embodiment

Figure 16:
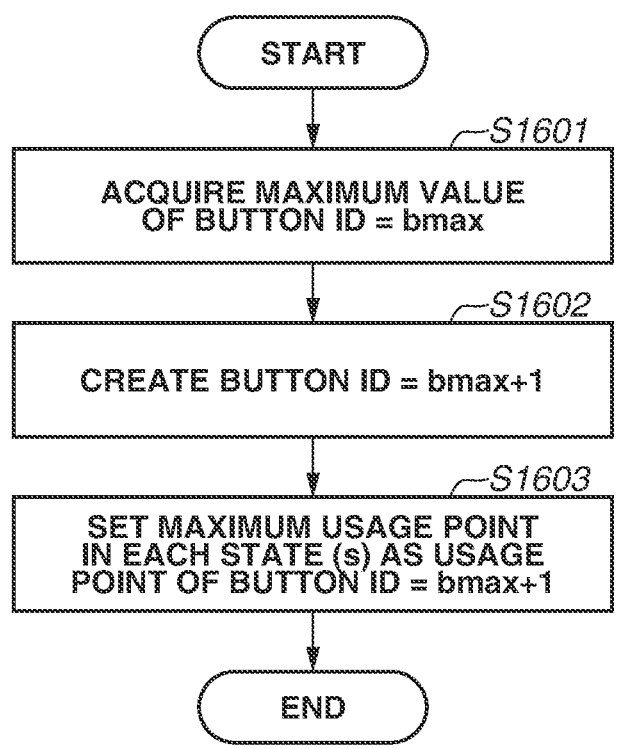
FIG. 16 is a flowchart illustrating processing of an MFP according to the third exemplary embodiment of the present disclosure.

In a configuration where a button is preferentially displayed based on the number of usage times as in the first exemplary embodiment, because the number of usage times of a newly-registered button is 0, the newly-registered button is not preferentially displayed. In the present exemplary embodiment, a description will be given of an example of preferentially displaying a newly-registered button even if the number of usage times is small. Because the basic configuration of the present exemplary embodiment is similar to that of the first exemplary embodiment, only a difference will be described. FIG. 16 is a flowchart illustrating processing of button registration according to the present exemplary embodiment.

The description will be given of an example case where the user newly registers a "store estimate report" button. The button information table 500 illustrated in FIG. 5 and a usage point management table 1500 (j=1000) illustrated in FIG. 15 are used in the description of the example.

If the user registers the "store estimate report" button, a button registration flow illustrated in FIG. 16 is started. First of all, in step S1601, a button ID with the maximum value, (bmax)=B007, is acquired from the button information table 500 illustrated in FIG. 5. Next, in step S1602, a button ID (b=B008) is created for the acquired bmax (B007)+1. The button ID (b=B008) created in step S1602 is allocated to the "store estimate report" button to be registered. FIG. 17 illustrates a button information table 1700 at this time. As indicated on a row 1718, the "store estimate report" button with the button ID (b=B008) is registered.

In step S1603, the "store estimate report" button is registered in the usage point management table 408. At this time, the largest usage points in each state are set to the button ID (b=B008). Specifically, if the state (s) of the apparatus is S00, because the 263 usage points of the button ID (b=B005) are the largest, the usage points of the button ID (b=B008) are set to 263. In a similar manner, if the state (s) of the apparatus is S01, the 2534 usage points of the button ID (b=B002) are set. If the state (s) of the apparatus is S10, the 87 usage points of the button ID (b=B001) are set. If the state (s) of the apparatus is S11, the 404 usage points of the button ID (b=B002) are set. FIG. 15 illustrates the usage point management table 1500 obtained after the foregoing setting is ended. The newly-registered button is indicated on a column 1504, and the usage points thereof in each state have the largest value among the usage points of the other buttons. In other words, immediately after a button is newly registered, the registered button is displayed most preferentially even if the MFP 101 is in any state.

An example of displaying buttons using the usage point management table 1500 illustrated in FIG. 15 will be described with reference to FIGS. 18A and 18B. For example, if the state of the apparatus is a state where "a document is placed" and "no unprinted print job is held" (s=S10), menu screens 1800 and 1801 illustrated in FIG. 18A are displayed. If the state of the apparatus is S00, menu screens 1820 and 1821 illustrated in FIG. 18B are displayed. In the cases of both states, the newly-registered button is displayed in the first place.

In the present exemplary embodiment, the description has been given of an example of preferentially displaying a button registered by the user, but a button to be preferentially displayed is not limited to this. A button automatically created by the apparatus, or a button registered by a system administrator may be preferentially displayed in a similar manner.

Fourth Exemplary Embodiment

In the present exemplary embodiment, the description will be given of a configuration of correcting usage points in such a manner that a sum (hereinafter, referred to as "Psum(s)") of the usage points in each state (s) in the usage point management table 408 becomes constant.

Because the basic configuration of the present exemplary embodiment is similar to that of the first exemplary embodiment, only a difference will be described. FIG. 19 is a flowchart illustrating update processing of a usage point management table. Because the basic configuration of the flowchart illustrated in FIG. 19 is similar to that of the flowchart illustrated in FIG. 11, only a difference will be described.

An example of correcting usage points in such a manner that Psum(s) does not exceed PsumMAX(=100) will now be described as an example.

A specific description will be given assuming that the user has executed jobs 500 times, a usage point management table 2000 (j=500 normalized by 100) illustrated in FIG. 20A is used, and a button with a button ID (b=B001) is pressed in the state (S10) of the apparatus where "a document is placed" and "no unprinted print job is held".

In step S1102, the button management unit 401 acquires, from the usage point management table 2000, 35 usage points of a button ID (b=B001) corresponding to the state (s=S10) of the apparatus.

In step S1103, the button management unit 401 adds an additional value, 10, to the acquired usage points and updates the usage points of the button ID (b=B001) in the state (s=S10) of the apparatus in the usage point management table to 45. The usage point management table 2000 is accordingly updated to a usage point management table 2100 (j=501 before normalized by 100).

Next, in step S1901, the button management unit 401 determines that a total value Psum (S10)=106 of usage points of buttons in the state (s=S10) of the apparatus is larger than PsumMax (=100) (YES in step S1901), and the processing proceeds to next step S1902. In step S1901, the button management unit 401 determines that Psum(s) is not larger than PsumMax (NO in step S1901), the correction is not performed and the processing is ended.

In step S1902, the button management unit 401 corrects the usage point of each button in the state (s=S10) of the apparatus to the following value.

$$p(S10, b) = \left[\frac{P(S10, b) \times PsumMAX}{Psum(S10)}\right]$$

([ ] denotes integer part)

For example, if the button with the button ID (b=B001) that has been pressed is used as an example, the usage points are calculated as follows.

$$p(S10, B001) = [45 \times 100/106] = [42.425 \ldots] = 42$$

In a similar manner, if the button with the button ID (b=B002) that has not been pressed is used as an example, the usage points are calculated as follows.

$$p(S10, B002) = [39 \times 100/106] = [36.792 \ldots] = 36$$

By the correction, the usage point management table is finally updated to a usage point management table 2200 (j=501 after normalized by 100) illustrated in FIG. 20B, and Psum(S10) is 97, which is equal to or smaller than PsumMAX.

If the menu screens are displayed based on the updated usage points, in accordance with the above-described flow described with reference to FIG. 8, the screens 650 and 651 (j=500, s=S10) illustrated in FIG. 6B2 are switched to the screens 660 and 661 (j=501, s=S10), and the positions of the custom button 511 and the custom button 512 are switched in a similar manner to the first exemplary embodiment.

As in the present exemplary embodiment, the correction of keeping the sum Psum(s) at a fixed value or less has an effect of preventing a button that has been used with high frequency in the past but recently not used as frequently as in the past from being preferentially displayed. In other words, usage points can be set with a focus more on the recent button usage frequency than on the past button usage frequency.

As described above, usage points of each button are corrected to the following value.

$$p(S10, b) = \left[\frac{P(S10, b) \times PsumMAX}{Psum(S10)}\right]$$

([ ] denotes integer part)

Because the above-described correction is performed only when Psum(s10) is larger than PsumMAX, the following inequation is obtained.

$$1 > \frac{PsumMAX}{Psum(S10)}$$

Because the usage points of each button are multiplied by a numeral value equal to or smaller than 1 each time the button is pressed, the usage points of a button that have had a high usage frequency and a high usage point in the past automatically decline as the usage frequency declines. In addition, by keeping a value of Psum at a fixed value or less, data capacity can be saved as compared with a case where usage points are indefinitely added.

As described above, it is possible to decrease the influence on button rearrangement by the past numbers of button usage times and add weight to the button rearrangement based on the latest numbers of usage times. Buttons can be recommended to a user with high accuracy. A method of decreasing the influence on button rearrangement by the past numbers of button usage times is not limited to the above-described method, and the usage points of each button may be multiplied by a predetermined constant equal to or smaller than 1 each time the button is executed.

Fifth Exemplary Embodiment

In a case where buttons are rearranged based on the state of the MFP 101 and button usage history as in the first exemplary embodiment, a user who memorizes the buttons by the positions thereof may feel bothersome if the arrangement order of the buttons is automatically changed. In view of the foregoing, in the present exemplary embodiment, the description will be given of an example in which, even in a case where button rearrangement is performed based on usage history, the button rearrangement is not performed on the condition that the button rearrangement is within the same page.

For example, in the case where the state of the MFP 101 is S10 in the usage point management table 1200 in the first exemplary embodiment, a difference in usage points between the "send to owner" button and the "one-sided monochrome copy" button is equal to or smaller than an additional value (10), so that, if the two buttons are alternately used, the positions of the two buttons are switched each time the button is used, which is troublesome to the user.

In the present exemplary embodiment, processing of holding a usage order list obtained before an additional value is added to a usage point, comparing the held usage order list with a usage order list obtained after the additional value is added to the usage points, and updating the usage order list only in a case where the rearrangement affects a plurality of pages is performed. Because the basic configuration of the present exemplary embodiment is similar to that of the first exemplary embodiment, only a difference will be described.

Figure 21:
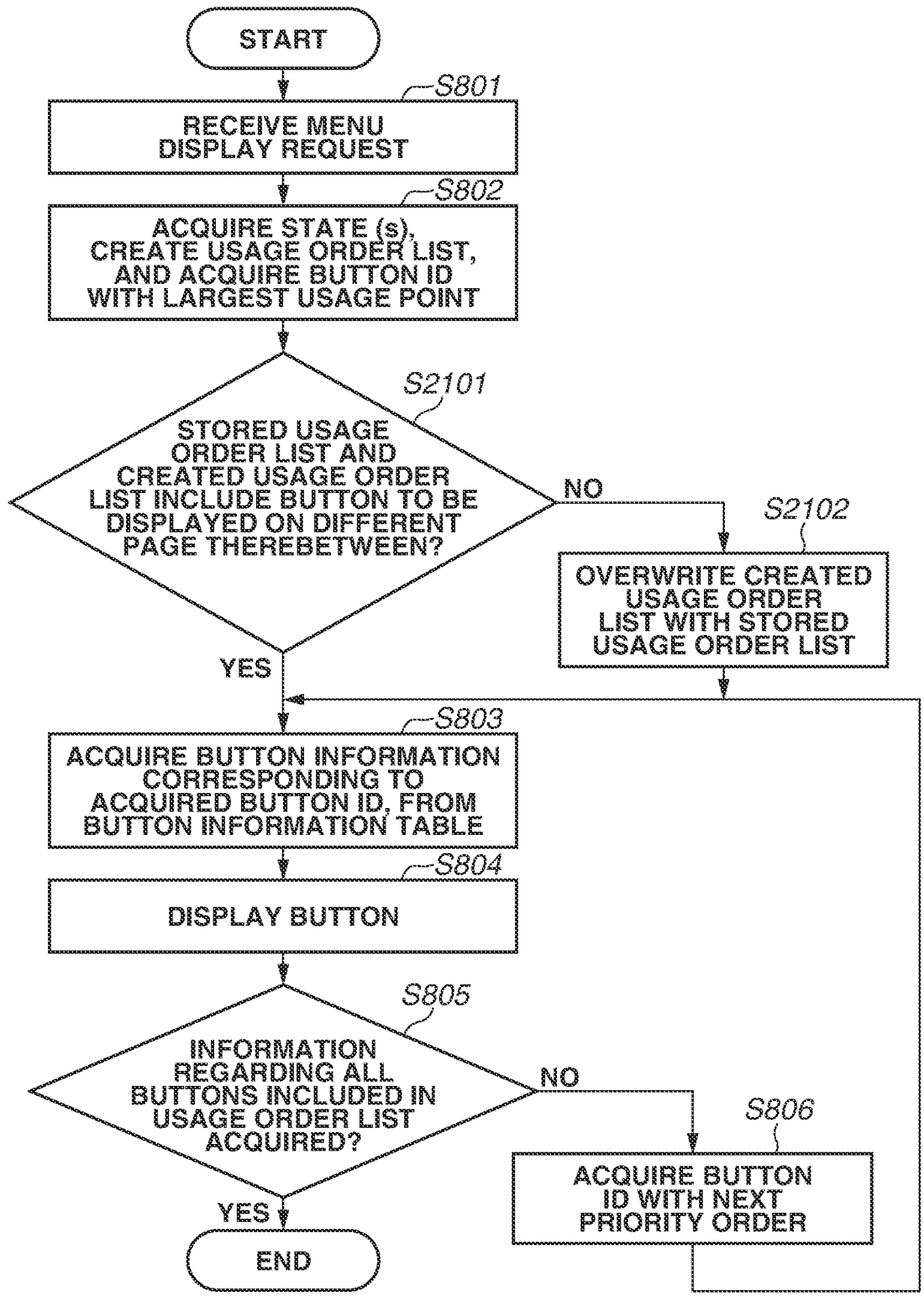
FIG. 21 is a flowchart illustrating processing of an MFP according to a fifth exemplary embodiment of the present disclosure.

FIG. 21 is a flowchart illustrating processing of displaying buttons according to the present exemplary embodiment. Because the basic configuration of the flowchart illustrated in FIG. 21 is similar to the flowchart illustrated in FIG. 8, only a difference will be described.

The following description will be given assuming that the state of the MFP 101 is S10 by reference to the usage point management table 1200 (j=501) illustrated in FIG. 10B.

In step S802, the menu display unit 403 acquires a state of the MFP 101 and creates a usage order list. Specifically, the below-described usage order list is created at this time. In the present exemplary embodiment, because at most four buttons can be displayed on one page of the menu screen, the usage order list is separated into page groups each including four buttons enclosed by square brackets.

Created usage order list={[B001, B002, B005, B003], [B004, B006, B007]}

In step S2101, the menu display unit 403 determines whether there is a change of a page where a button is to be display between the held usage order list (S10) and the created usage order list. The held usage order list is a usage order list acquired in the previous time (j=500), for example. In this case, the held usage order list is a usage order list created based on the usage point management table 1100 (s=S10) illustrated in FIG. 10A.

Held usage order list (S10)={[B002, B001, B005, B003], [B004, B006, B007]}

The held usage order list may be a list created by arranging the buttons currently displayed on the menu screen in the display order.

In a case where the menu display unit 403 determines that there is no change of the page where the button is to be displayed (NO in step S2101), the processing proceeds to step S2102. In a case where there is a change of the page where the button is to be displayed (YES in step S2101), the processing proceeds to step S803. Here, because there is no change of the page (NO in step S2101), the processing proceeds to step S2102.

In step S2102, the menu display unit 403 overwrites the created usage order list with the held usage order list. In other words, the created usage order list is overwritten into a usage order list (S10)={[B002, B001, B005, B003], [B004, B006, B007]}. If buttons are displayed based on the usage order list, the buttons are not rearranged even after a button is used. In other words, button rearrangement within the same page is not performed, and buttons are rearranged only when the button rearrangement occurs in a different page.

Other Exemplary Embodiments

In the above-described exemplary embodiments, the display order of buttons is determined based on usage points. Nevertheless, the configuration is not limited to this, and display modes of buttons may be determined based on usage points. For example, a configuration of displaying a button with the highest usage points in a certain state of the MFP in the largest size on the menu screen and displaying a button with the second highest usage points in the second largest size on the menu screen may be employed. With this configuration, a button frequently-used by the user is displayed in a large size, which enables the user to easily find the desired button. A display mode of a button is not limited to a size, and the shape or color of a button may be changed, or a button may be preferentially displayed by an animation. In addition, after a display mode of a button is changed, the button may be further preferentially displayed in a higher display order.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure includes exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-048200, filed Mar. 18, 2020, which is hereby incorporated by reference herein in its entirety.

What is claimed is:

1. An image forming apparatus configured to display an operation screen including a plurality of buttons, operation the image forming apparatus comprising:
at least one memory storing instructions; and
at least one processor, wherein the instructions, when executed by the at least one processor, cause the image forming apparatus to:
detect a state of the image forming apparatus, wherein there is a plurality of states of the image forming apparatus including at least a state in which a document is placed on a scanner of the image forming apparatus and a state in which no document is placed on the scanner of the image forming apparatus;
associate the number of usage times of the plurality of buttons used in the state in which the document is placed on the scanner of the image forming apparatus with the number of usage times of the plurality of buttons used in the state in which no document is placed on the scanner of the image forming apparatus, and store the associated numbers; and
in a case where either the state in which the document is placed on the scanner of the image forming apparatus or the state in which no document is placed on the scanner of the image forming apparatus is detected, rearrange the plurality of buttons included in the operation screen based on the stored numbers of usage times of the plurality of buttons that correspond to the detected state of the image forming apparatus, and display the rearranged buttons.

2. The image forming apparatus according to claim 1, wherein, at a time of the display, the plurality of buttons is displayed in a display order that is based on the numbers of usage times that correspond to the detected state of the image forming apparatus.

3. The image forming apparatus according to claim 2, wherein, at the time of the display, the plurality of buttons is displayed in such a manner that a button having higher priority becomes higher in the display order.

4. The image forming apparatus according to claim 1, wherein, at a time of the display, the plurality of buttons is displayed in a display mode that is based on the numbers of usage times that correspond to the detected state of the image forming apparatus.

5. The image forming apparatus according to claim 1, wherein, at a time of the storing, the numbers of usage times are stored for each user of the image forming apparatus.

6. The image forming apparatus according to claim 1, wherein the detected state in which the document is placed on the scanner of the image forming apparatus includes a state in which the image forming apparatus holds a job transmitted from an external device.

7. The image forming apparatus according to claim 1, wherein, if a predetermined state is detected by the detection, at a time of the display, the plurality of buttons is displayed in such a manner that a predetermined button becomes high in a display order irrespective of the stored numbers of usage times of the plurality of buttons.

8. The image forming apparatus according to claim 7, wherein the predetermined button is a button for executing a job transmitted from an external device.

9. The image forming apparatus according to claim 1, wherein, at a time of the display, the plurality of buttons is displayed in such a manner that a display order of a newly-registered button becomes high in a display order irrespective of the stored numbers of usage times of the plurality of buttons.

10. The image forming apparatus according to claim 1, wherein, at a time of the display, in a case where a display order of buttons is changed within a same page, the display order of the buttons is not changed.

11. The image forming apparatus according to claim 1, wherein the image forming apparatus includes the scanner, and stores a state of the image forming apparatus in which paper is set on the scanner in association with the numbers of usage times of the plurality of the buttons, and
wherein the image forming apparatus displays the plurality of buttons according to a priority based on the stored numbers of usage times when the state of the image forming apparatus is detected.

12. The image forming apparatus according to claim 1, wherein the image forming apparatus stores a first state of the image forming apparatus in association with numbers of first usage times of the plurality of the buttons and a second state of the image forming apparatus in association with numbers of second usage times of the plurality of the buttons, and
wherein the image forming apparatus displays the plurality of buttons according to a priority based on the numbers of the first usage times when the first state of the image forming apparatus is detected and displays the plurality of buttons according to a priority based on the numbers of the second usage times when the second state of the image forming apparatus is detected.

13. The image forming apparatus according to claim 1, wherein the plurality of buttons includes at least a print button to perform printing and a copy button to perform copying.

14. The image forming apparatus according to claim 1, wherein the image forming apparatus displays most recently used buttons in preference to buttons used in past on the operation screen.

15. The image forming apparatus according to claim 1, wherein the instructions, when executed by the at least one processor, further cause the image forming apparatus to:
count numbers of usage times of the plurality of the buttons for each of the plurality of the states of the image forming apparatus.

16. The image forming apparatus according to claim 1, wherein the image forming apparatus displays, according to detecting change of the state of the image forming apparatus, the plurality of buttons on the operation screen based on the stored numbers of usage times of the plurality of buttons corresponding to the changed state of the image forming apparatus.

17. A method for an image forming apparatus that displays an operation screen including a plurality of buttons, an operation the method comprising:
detecting a state of the image forming apparatus, wherein there is a plurality of states of the image forming apparatus including at least a state in which a document is placed on a scanner of the image forming apparatus and a state in which no document is placed on the scanner of the image forming apparatus;
associating the number of usage times of the plurality of buttons used in the state in which the document is placed on the scanner of the image forming apparatus with the number of usage times of the plurality of buttons used in the state in which no document is placed on the scanner of the image forming apparatus, and storing the associated numbers; and
in a case where either the state in which the document is placed on the scanner of the image forming apparatus or the state in which no document is placed on the scanner of the image forming apparatus is detected, rearranging the plurality of buttons included in the operation screen based on the stored numbers of usage times of the plurality of buttons that correspond to the detected state of the image forming apparatus, and displaying the rearranged buttons.

18. A non-transitory computer-readable storage medium storing a program to cause a computer to perform a method for an image forming apparatus that displays an operation screen including a plurality of buttons, the method comprising:
detecting a state of the image forming apparatus, wherein there is a plurality of states of the image forming apparatus including at least a state in which a document is placed on a scanner of the image forming apparatus and a state in which no document is placed on the scanner of the image forming apparatus;
associating the number of usage times of the plurality of buttons used in the state in which the document is placed on the scanner of the image forming apparatus with the number of usage times of the plurality of buttons used in the state in which no document is placed on the scanner of the image forming apparatus, and storing the associated numbers; and in a case where either the state in which the document is placed on the scanner of the image forming apparatus or the state in which no document is placed on the scanner of the image forming apparatus is detected, rearranging the plurality of buttons included in the operation screen based on the stored numbers of usage times of the plurality of buttons that correspond to the detected state of the image forming apparatus, and displaying the rearranged buttons.

* * * * *